United States Patent
Weisberg et al.

(10) Patent No.: US 7,231,122 B2
(45) Date of Patent: Jun. 12, 2007

(54) PHOTONIC CRYSTAL WAVEGUIDES AND SYSTEMS USING SUCH WAVEGUIDES

(75) Inventors: Ori Weisberg, Cambridge, MA (US); Steven A. Jacobs, Needham, MA (US); Maksim Skorobogatiy, Montreal (CA); Steven G. Johnson, Cambridge, MA (US); Uri Kolodny, Cambridge, MA (US)

(73) Assignee: OmniGuide, Inc., Cambridge, MA (US)

( * ) Notice: Subject to any disclaimer, the term of this patent is extended or adjusted under 35 U.S.C. 154(b) by 0 days.

(21) Appl. No.: 10/978,605

(22) Filed: Nov. 1, 2004

(65) Prior Publication Data

US 2005/0271340 A1  Dec. 8, 2005

Related U.S. Application Data

(60) Provisional application No. 60/560,458, filed on Apr. 8, 2004, provisional application No. 60/561,020, filed on Apr. 9, 2004, provisional application No. 60/603,067, filed on Aug. 20, 2004.

(51) Int. Cl.
 *G02B 6/02* (2006.01)
 *G02B 6/26* (2006.01)
 *G02B 6/032* (2006.01)
 *G02B 5/30* (2006.01)

(52) U.S. Cl. .................. 385/123; 385/122; 385/126; 385/127; 385/28; 359/500

(58) Field of Classification Search .............. None
See application file for complete search history.

(56) References Cited

U.S. PATENT DOCUMENTS 4,478,488 A   10/1984   Bagley (Continued)

FOREIGN PATENT DOCUMENTS

EP   0 844 501   5/1998

(Continued)

OTHER PUBLICATIONS

Bormashenko, Edward et al. "Development of new near-infrared filters based on the "sandwich" polymer-chalcogenide glass-polymer composites." Optical Engineering. 40:5, 661-662, May 2001.

(Continued)

*Primary Examiner*—Sung Pak
*Assistant Examiner*—Hoang Tran
(74) *Attorney, Agent, or Firm*—Fish & Richardson P.C.

(57) ABSTRACT

In general, in one aspect, the invention features an apparatus that includes a photonic crystal fiber configured to guide a mode of electromagnetic radiation at a wavelength, $\lambda$, along a waveguide axis. The fiber includes a core extending along the waveguide axis, and a confinement region extending along the waveguide axis and surrounding the core. The confinement region includes alternating layers of a first and a second dielectric material having thicknesses $d_1$ and $d_2$ and different refractive indices $n_1$ and $n_2$, respectively. The thickness of at least one of the alternating layers of the first material differs from thickness $d_1^{QW}$ or at least one of the alternating layers of the second material differs from thickness $d_2^{QW}$, where $d_1^{QW}$ and $d_2^{QW}$ correspond to a quarter-wave condition for the two dielectric materials given by $d_1^{QW}=\lambda/(4\sqrt{n_1^2-1})$ and $d_2^{QW}=\lambda/(4\sqrt{n_2^2-1})$, respectively. The photonic crystal fiber has an attenuation for the guided mode at the wavelength $\lambda$ that is reduced by a factor of about two or more relative to an attenuation for a reference fiber that is identical to the photonic crystal fiber except that the reference fiber has alternating layer thicknesses corresponding to the quarter-wave condition.

48 Claims, 17 Drawing Sheets

U.S. PATENT DOCUMENTS

| | | |
|---|---|---|
| 4,688,893 A | 8/1987 | Laakmann |
| 4,758,066 A | 7/1988 | Someda |
| 4,930,863 A | 6/1990 | Croitoriu et al. |
| 5,109,446 A | 4/1992 | Kaltschmidt |
| 5,497,440 A | 3/1996 | Croitoru et al. |
| 5,729,646 A | 3/1998 | Miyagi et al. |
| 5,815,627 A | 9/1998 | Harrington |
| 5,935,491 A | 8/1999 | Tripathy et al. |
| 6,130,780 A | 10/2000 | Joannopoulos et al. |
| 6,404,966 B1 | 6/2002 | Kawanishi et al. |
| 6,463,200 B2 | 10/2002 | Fink et al. |
| 6,563,981 B2 * | 5/2003 | Weisberg et al. ............. 385/28 |
| 6,589,334 B2 | 7/2003 | John et al. |
| 6,603,911 B2 * | 8/2003 | Fink et al. .................. 385/123 |
| 6,606,440 B2 | 8/2003 | Hasegawa et al. |
| 6,625,364 B2 | 9/2003 | Johnson et al. |
| 6,728,439 B2 | 4/2004 | Weisberg et al. |
| 6,735,369 B2 | 5/2004 | Komachi et al. |
| 6,788,864 B2 | 9/2004 | Ahmad et al. |
| 6,801,698 B2 | 10/2004 | King et al. |
| 6,816,243 B2 | 11/2004 | Shurgalin et al. |
| 6,879,386 B2 | 4/2005 | Shurgalin et al. |
| 6,895,154 B2 | 5/2005 | Johnson et al. |
| 6,898,359 B2 | 5/2005 | Soljacic et al. |
| 6,903,873 B1 | 6/2005 | Joannopoulos et al. |
| 2002/0164137 A1 | 11/2002 | Johnson et al. |
| 2003/0031852 A1 | 2/2003 | Fink et al. |
| 2003/0044158 A1 | 3/2003 | King et al. |
| 2003/0044159 A1 | 3/2003 | Anderson et al. |
| 2004/0013379 A1 | 1/2004 | Johnson et al. |
| 2004/0137168 A1 | 7/2004 | Fuflyigin |
| 2004/0141702 A1 | 7/2004 | Fuflyigin et al. |
| 2004/0223715 A1 | 11/2004 | Benoit et al. |
| 2005/0226579 A1 | 10/2005 | Fink et al. |
| 2005/0259933 A1 | 11/2005 | Temelkuran et al. |
| 2005/0259934 A1 | 11/2005 | Temelkuran et al. |
| 2005/0259942 A1 | 11/2005 | Temelkuran et al. |
| 2005/0259944 A1 | 11/2005 | Anderson et al. |

FOREIGN PATENT DOCUMENTS

| | | |
|---|---|---|
| WO | WO 00/22466 | 10/1999 |
| WO | WO 02/14946 A1 | 2/2002 |
| WO | WO 02/41050 A2 | 5/2002 |
| WO | WO 02/072489 A2 | 9/2002 |
| WO | WO 03/052473 A1 | 12/2002 |
| WO | WO 03/058308 | 7/2003 |
| WO | WO 03/079073 | 9/2003 |
| WO | WO 03/797077 A1 | 9/2003 |

OTHER PUBLICATIONS

Charlton, C. et al. "Hollow-waveguide gas sensing with room-temperature quantum cascade lasers." IEE Proc. Optoelectron., 150::4, pp. 306-309, Aug. 2003.

Harrington, James. "A Review of IR Transmitting, Hollow Waveguides." Fiber and Integrated Optics, 19, 211-217, 2000.

Mizrahi et al. "Bragg reflection waveguides with a matching layer." Optics Express, 12:14, pp. 3156 and 3170, Jul. 1, 2004.

Nubling et al. "Hollow-waveguide delivery systems for high-ower, industrial $CO_2$ lasers." Applied Optics, 34:3, pp. 372-380, 1996.

Pottage et al. "Robust photonic band gaps for hollow core guidance in PCF made from high index glass." Optics Express, 11:22, pp. 2854-2861, Oct. 21, 2003.

Skorobogatiy et al. "Geometric variations in high index-contrast waveguides, coupled mode theory in curvilinear coordinates." Optics Express, 10, pp. 1227, 2002.

Temelkuran et al. Wavelength-scalable hollow optical fibres with large photonic bandgaps for $CO_2$ laser transmission. Nature, 420:12, pp. 650-653, Dec. 12, 2002.

Yeh et al. "Theory of Bragg Fiber." J. Opt. Soc Am., 68, pp. 1196, 1978.

Takashi Katagiri et al. "Metal-covered photonic bandgap multilayer for infrared hollow waveguides", Applied Optics, Vol. 41, No. 36: pp. 7603-7606 (2002).

* cited by examiner

PHOTONIC CRYSTAL WAVEGUIDES AND SYSTEMS USING SUCH WAVEGUIDES

CROSS-REFERENCE TO RELATED APPLICATIONS

This application claims benefit under 35 USC §119(e)(1) to Provisional Patent Application No. 60/560,458, entitled "PHOTONIC CRYSTAL FIBER APPLICATIONS," filed on Apr. 8, 2004, to Provisional Patent Application No. 60/561,020, entitled "PHOTONIC CRYSTAL FIBER APPLICATIONS," filed on Apr. 9, 2004, and to Provisional Patent Application No. 60/603,067, entitled "PHOTONIC CRYSTAL WAVEGUIDES AND SYSTEMS USING SUCH WAVEGUIDES," filed on Aug. 20, 2004, the entire contents all of which are hereby incorporated by reference.

BACKGROUND

This invention relates to the field of photonic crystal waveguides and systems using photonic crystal waveguides.

Waveguides play important roles in numerous industries. For example, optical waveguides are widely used in telecommunications networks, where fiber waveguides such as optical fibers are used to carry information between different locations as optical signals. Such waveguides substantially confine the optical signals to propagation along a preferred path or paths. Other applications of optical waveguides include imaging applications, such as in an endoscope, and in optical detection. Optical waveguides can also be used to guide laser radiation (e.g., high intensity laser radiation) from a source to a target in medical (e.g., eye surgery) and manufacturing (e.g., laser machining and forming) applications.

The most prevalent type of fiber waveguide is an optical fiber, which utilizes index guiding to confine an optical signal to a preferred path. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode for a given wavevector parallel to the waveguide axis. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts ranging from about 0.2% to 3% for wavelengths in the range of 1.5 μm, depending on the application.

Another type of waveguide fiber, one that is not based on TIR index-guiding, is a Bragg fiber, which includes multiple alternating dielectric layers surrounding a core about a waveguide axis. The multiple layers form a cylindrical mirror that confines light to the core over a range of frequencies. The alternating layers are analogous to the alternating layers of a planar dielectric stack reflector (which is also known as a Bragg mirror). The multiple layers form what is known as a photonic crystal, and the Bragg fiber is an example of a photonic crystal fiber. Photonic crystal structures are described generally in *Photonic Crystals* by John D. Joannopoulos et al. (Princeton University Press, Princeton N.J., 1995), the entire contents of which is hereby incorporated by reference.

SUMMARY

In one aspect, the invention features photonic crystal fibers with low attenuation characteristics, including low absorption loss and/or low radiation loss at the guided wavelength(s). When considering absorption loss in addition to radiation loss, the inventors have discovered that a photonic crystal fiber in which a certain portion or portions of a confinement region do not satisfy the quarter wave condition can exhibit lower attenuation than a similar fiber having a confinement region in which the quarter wave condition is satisfied. Accordingly, in certain aspects, the invention features photonic crystal fibers having confinement regions in which one or more layers do not satisfy the quarter wave condition. In some embodiments, the innermost layer or innermost two layers do not satisfy the quarter wave condition. The innermost layer or innermost two layers can have an optical thickness that is thicker or thinner than other layers in the confinement region.

In another aspect, the invention features photonic crystal fibers having a confinement region that includes a spiral portion and a non-spiral portion (e.g., an annular portion). In some embodiments, a photonic crystal fiber can include a confinement region that has an annular portion and a spiral portion, where the annular portion is between the core and the spiral portion. The annular and spiral portions can each include one or multiple layers. The annular portion can be formed from one or more materials different from the materials in the spiral portion. For example, one or more of the materials forming the portion closer to the core (e.g., the annular portion) can have a lower absorption at the guided wavelengths than one or more of the materials forming the portion further from the core (e.g., the spiral portion). In some embodiments, the portion adjacent to the core can be formed from materials with fewer impurities than the portion non-adjacent to the core. Fewer impurities in the confinement region layers closest to the core can reduce localized heating of the fiber in the confinement region by reducing scattering of guided radiation that penetrates the first few layers of the confinement region.

In general, the photonic crystal fibers can be drawn from fiber preforms.

Photonic crystal fibers can be used in a variety of applications. Accordingly, in a further aspect, the invention features systems that include photonic crystal fibers. For example, in some embodiments, photonic crystal fibers are used in telecommunication systems, laser delivery systems (e.g., medical laser delivery systems), and/or other optical systems (e.g., sensors, imaging systems).

In general, in one aspect, the invention features an apparatus including a photonic crystal fiber configured to guide a mode of electromagnetic radiation at a wavelength, λ, along a waveguide axis. The fiber includes a core extending along the waveguide axis, and a confinement region extending along the waveguide axis and surrounding the core. The confinement region includes alternating layers of a first and a second dielectric material having thicknesses $d_1$ and $d_2$ and different refractive indices $n_1$ and $n_2$, respectively. The thickness of at least one of the alternating layers of the first material differs from thickness $d_1^{QW}$ or at least one of the alternating layers of the second material differs from thickness $d_2^{QW}$, where $d_1^{QW}$ and $d_2^{QW}$ correspond to a quarter-wave condition for the two dielectric materials given by $d_1^{QW}=\lambda/(4\sqrt{n_1^2-1})$ and $d_2^{QW}=\lambda/(4\sqrt{n_2^2-1})$, respectively. The photonic crystal fiber has an attenuation for the guided mode at the wavelength $\lambda$ that is reduced by a factor of about two or more relative to an attenuation for a reference fiber that is identical to the photonic crystal fiber except that the reference fiber has alternating layer thicknesses corresponding to the quarter-wave condition.

Embodiments of the apparatus can include one or more of the following features and/or features of other aspects.

The confinement region can include an innermost layer that has a thickness different from $d_1^{QW}$ and $d_2^{QW}$. The innermost layer can have a thickness less than $d_1^{QW}$ and $d_2^{QW}$. The innermost layer can be one of the alternating layers of the first material. The innermost layer can include the first material and can have a thickness different from $d_1$. The confinement region can include a layer adjacent the innermost layer that has a thickness different from $d_1^{QW}$ and $d_2^{QW}$. The layer adjacent the innermost layer can include the second material and has a thickness different from $d_2$.

The confinement region further includes one or more additional layers of the first material having a thickness different from $d_1$ and $d_1^{QW}$. The confinement region further comprises one or more additional layers of the second material having thickness different from $d_2$ and $d_2^{QW}$.

The alternating layers can be annular layers. The alternating layers can include a first spiral layer and a second spiral layer of a spiral portion. The factor can be about three or more (e.g., about four or more, about five or more, about six or more, about seven or more, about eight or more, about nine or more, about 10 or more, about 15 or more, about 20 or more, about 30 or more, about 50 or more, about 100 or more).

The first and second materials can have different absorptions at $\lambda$. The first dielectric material can have an absorption of about 1 dB/m or more at $\lambda$ (e.g., about 5 dB/m or more, about 10 dB/m or more, about 20 dB/m or more, about 30 dB/m or more, about 50 dB/m or more, about 100 dB/m or more, about 200 dB/m or more, about 500 dB/m or more, about 1,000 dB/m or more). Alternatively, or additionally, The second dielectric material can have an absorption of about 1 dB/m or less at $\lambda$ (e.g., about 0.5 dB/m or less, about 0.2 dB/m or less, about 0.1 dB/m or less, 0.01 dB/m or less).

The first and second dielectric materials can have absorptions of $\alpha_1$ and $\alpha_2$ at $\lambda$, respectively, and a ratio $\alpha_1/\alpha_2$ is about 10 or more (e.g., about 20 or more, about 50 or more, about 100 or more, about 200 or more, about 300 or more, about 500 or more, about 1,000 or more, about 2,000 or more).

$|n_1-n_2|$ can be less than 0.1 (e.g., <0.2, <0.3, <0.4, <0.5, <0.6, <0.7, <0.8, <0.9, <1.0). $\lambda$ can be in a range from about 400 nm to about 900 nm, in a range from about 900 nm to about 1,600 nm, about 1,600 nm to about 2,000 nm, or about 2,000 nm or more. In some embodiments, $\lambda$ is about 10.6 μm.

In some embodiments, the first dielectric material is a glass, such as an inorganic glass (e.g., a chalcogenide glass, such as a chalcogenide glass including As and Se). The second dielectric material can be an inorganic glass. In certain embodiments, the first dielectric material is a chalcogenide glass and the second dielectric material is a non-chalcogenide glass. The non-chalcogenide glass can be an oxide glass.

In some embodiments, the first dielectric material is a polymer (e.g., a thermoplastic polymer). The second dielectric material can be an inorganic glass or a polymer.

In general, in another aspect, the invention features a waveguide, including a core extending along a waveguide axis, and a confinement region surrounding the core. The confinement region includes a spiral portion and a non-spiral portion, and the spiral portion and the non-spiral portion extend along the waveguide axis.

Embodiments of the waveguide can include one or more of the following features and/or features of other aspects.

The waveguide can be a fiber waveguide. In some embodiments, the fiber waveguide is a photonic crystal fiber, such as a Bragg fiber.

The waveguide can be configured to guide radiation having a wavelength $\lambda$ and the non-spiral portion comprises a layer that has an optical thickness of about $\lambda/4$ or less in a radial direction orthogonal to the waveguide axis. The waveguide is configured to guide radiation having a wavelength $\lambda$ of about 0.4 μm to about 0.8 μm, about 0.8 μm to about 2.0 μm, or about 2 μm to about 15 μm.

The core can include a hollow portion extending along the waveguide axis. The core can have a radius of about 0.5 μm to about 10 μm, or of about 10 μm to about 2,000 μm.

The spiral portion can include a multilayer structure comprising at least two layers of the different materials encircling the core multiple times. The at least two layers of the different materials can encircle the core four times or more (e.g., five times or more, six times or more, seven times or more, eight times or more, 10 times or more, 12 times or more, 15 times or more).

The different materials can include a high-index dielectric material and a low-index dielectric material. A ratio of the refractive index of the high-index material to that of the low-index material can be about 1.1 or more (e.g., about 1.2 or more, about 1.3 or more, about 1.4 or more, about 1.5 or more, about 1.6 or more, about 1.7 or more, about 1.8 or more, about 1.9 or more, about 2.0 or more). The different materials can include a polymer (e.g., a thermoplastic polymer, such as a polyolefin) and a glass (e.g., a chalcogenide glass or an oxide glass). In certain embodiments, the polymer includes polyethersulphone and the chalcogenide glass includes $As_2Se_3$.

The non-spiral portion can be an annular portion. In some embodiments the non-spiral portion is a holey portion. The non-spiral portion can be between the spiral portion and the core. The non-spiral portion can include an inorganic material, such as a glass. The glass can be, for example, a chalcogenide glass or a non-chalcogenide glass (e.g., an oxide glass or a halide glass).

The non-spiral portion can have a refractive index profile that varies along a radial direction orthogonal to the waveguide axis. Alternatively, the non-spiral portion can have a refractive index profile that is substantially constant along a radial direction orthogonal to the waveguide axis. In some embodiments, the non-spiral portion includes a structure comprising one or more layers of one or more materials. For example, the non-spiral portion can include a multilayer structure comprising two or more layers of different materials (e.g., three or more layers, four or more layers, five or more layers, six or more layers, seven or more layers, eight or more layers, nine or more layers, 10 or more layers, 12 or more layers 15 or more layers, 20 or more layers).

In general, in another aspect, the invention features a method, including rolling a planar article to form a spiral structure, depositing a material on the spiral structure to form a intermediate structure, and forming a fiber waveguide. Forming the fiber waveguide includes drawing a fiber preform derived from the intermediate structure.

Embodiments of the method can include one or more of the following features and/or features of other aspects.

The material can be deposited on an inside or outside of the spiral structure. The planar article can be rolled around a mandrel to form the spiral structure. The mandrel can be hollow. The rolled planar article can be consolidated around the mandrel. Consolidating can include heating the spiral structure. This heating can be performed under vacuum. At least a portion of the mandrel can be removed from within the spiral structure prior to depositing the material within the spiral structure. For example, the mandrel can be etched to remove at least a portion of the mandrel. Etching can be performed using an acid.

The planar article can be a multilayer structure comprising at least two layers comprising materials with different refractive indices. The layers can include a layer of a first material and a pair of layers of a second material sandwiching the first material layer. The different materials can include a first material including a glass and a second material including a polymer.

The multilayer structure can be formed by disposing a layer of a first material on a surface of a layer of a second material to form the multilayer structure, wherein the first and second materials are different. The first material can be further disposed on a second surface of the layer of the second material to form the multilayer structure. The second material can be a polymer.

The depositing can include sputtering or evaporating. One or more additional layers can be deposited on the layer of the first material to form the multilayer article. The material can be deposited on the spiral structure using chemical vapor deposition (e.g., using microwave-assisted chemical vapor deposition or thermal chemical vapor deposition).

The material deposited on the spiral structure can be a glass, such as a chalcogenide glass.

In general, in another aspect, the invention features a method that includes providing a hollow spiral structure and depositing a layer of a material on the hollow spiral structure using chemical vapor deposition.

Embodiments of the method can include one or more features of other aspects.

In a further aspect, the invention features a system that includes a laser, the waveguide or apparatus of the foregoing aspects, and a delivery device. The waveguide is configured to accept radiation emitted from the laser and the delivery device allows an operator to direct radiation emitted from the photonic crystal fiber to target tissue of a patient.

Embodiments of the system can include one or more of the following features and/or features of other aspects. The laser can be a $CO_2$ laser or an Er:YAG laser. The delivery device can include a handpiece and/or an endoscope.

Embodiments of the invention may include one or more of the following advantages. In some embodiments, a photonic crystal fiber can have relatively low attenuation at a guided wavelength or wavelengths. For example, the confinement region of a photonic crystal fiber can feature multiple layers whose optical thickness has been optimized to reduce (e.g., minimize) attenuation of a signal at the guided wavelengths.

Because of the reduced attenuation one can use lower power signal sources and/or the need to amplify a transmitted signal can be reduced. Reduced attenuation can also enable use of fibers in high power applications, where high absorption of transmitted energy may otherwise damage the fiber.

In some embodiments, a photonic crystal fiber can be used to deliver radiation from a relatively high power laser. As an example, a photonic crystal fiber can be used to deliver high power radiation from a $CO_2$ laser to a target.

In certain embodiments, photonic crystal fibers can be manufactured relatively economically. For example, significant amounts of a fiber capable of guiding relatively high power laser radiation (e.g., from a $CO_2$ laser) can be drawn from a fiber preform.

In some embodiments, photonic crystal fibers can be used to deliver radiation from relatively high power lasers in medical applications, improving the maneuverability of a laser delivery device compared to devices that use an articulated arm. Accordingly, medical laser systems utilizing photonic crystal fibers may be used to perform procedures demanding a relatively high level of maneuverability.

The details of one or more embodiments of the invention are set forth in the accompanying drawings and the description below. Other features and advantages of the invention will be apparent from the description and drawings, and from the claims.

DESCRIPTION OF DRAWINGS

FIG. 3A–FIG. 5 are plots comparing various parameters in optimized photonic crystal fibers in which the high and low index layers have a first set of refractive indices. In particular:

FIG. 3A is a plot of attenuation of the $HE_{11}$ mode for a test fiber and photonic crystal fibers optimized for different numbers of bilayers in the fibers' confinement region;

FIG. 4 is a plot of the ratio of the innermost high and low index layer thickness, $t_1$ and $t_2$, to the other high index and low index layer thickness, $t_H$ and $t_L$, for a photonic crystal fiber optimized using a four-parameter optimization for different numbers of bilayers;

FIG. 5 is a plot of the thickness of the outer high index and low index layers for photonic crystal fibers optimized using a four-parameter optimization for different numbers of bilayers. The quarter wave thickness is also shown.

FIG. 6 is a plot of attenuation of the $HE_{11}$ mode for a test fiber and photonic crystal fibers optimized for different numbers of bilayers in the fibers' confinement region;

FIG. 7 is a plot of the thickness ratio of the innermost high index layer, $t_1$, to the thickness of other high index layers, $t_H$, for a photonic crystal fiber optimized using a four-parameter optimization for different numbers of bilayers;

FIG. 8 is a plot of the thickness of the outer high index and low index layers for photonic crystal fibers optimized using a four-parameter optimization for different numbers of bilayers. The quarter wave thickness is also shown.

Like reference symbols in the various drawings indicate like elements.

DETAILED DESCRIPTION

Figure 1:
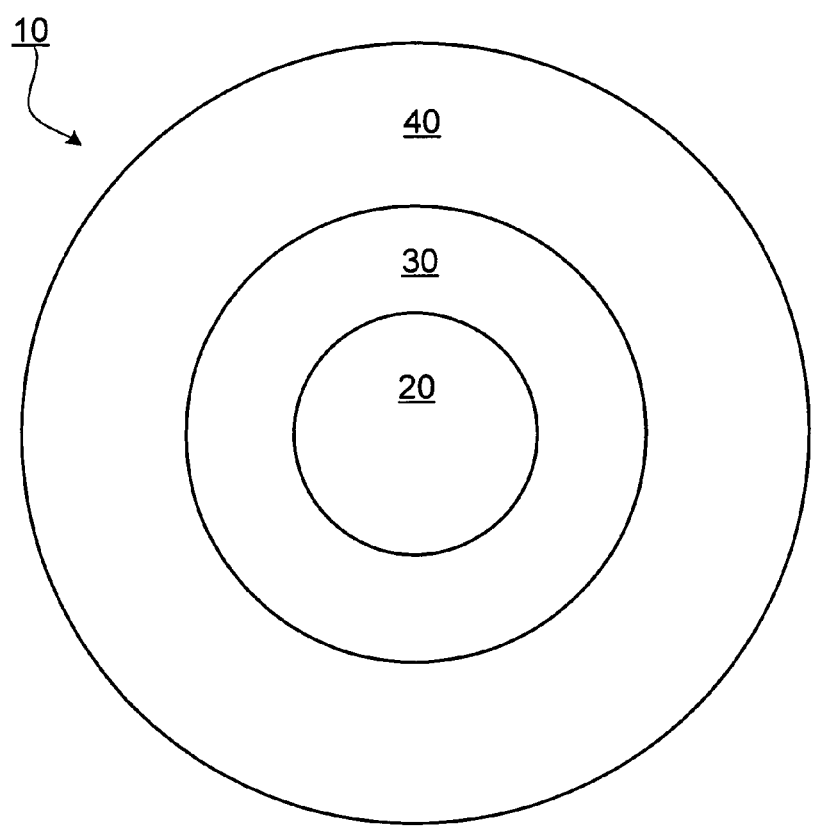
FIG. 1 is a cross-sectional view of an embodiment of a photonic crystal fiber.

In certain aspects, the invention features photonic crystal fibers and systems that use photonic crystal fibers. As used herein, a photonic crystal is a dielectric structure with a refractive index modulation that produces a photonic bandgap in the photonic crystal. A photonic bandgap, as used herein, is a range of frequencies in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for frequencies both below and above the gap, allowing light to be confined even in lower-index regions (in contrast to index-guided TIR structures). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector $\beta$ is conserved, so only states with a given $\beta$ need to be excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases as the magnitude of the index contrast in the confinement region increases.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent to the photonic crystal. For example, in air the light line is approximately given by $\omega=c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in Published PCT application WO 00/22466, the contents of which are incorporated herein by reference.

Some embodiments of photonic crystal fibers are described in U.S. patent application Ser. No. 10/057,258, entitled "LOW-LOSS PHOTONIC CRYSTAL FIBER HAVING LARGE CORE RADIUS," to Steven G. Johnson et al., filed Jan. 25, 2002 and published under Pub. No. US-2002-0164137-A1, the entire contents of which are hereby incorporated by reference.

Referring to FIG. 1, a photonic crystal fiber 10 includes a hollow core 20 surrounded by a dielectric confinement region 30 extending along a waveguide axis (normal to the plane of FIG. 1). Confinement region 30 is surrounded by a jacket 40 (e.g., a polymer jacket), which provides mechanical support and protects the core and confinement region from environmental hazards.

The radius of core 20 can vary depending on the end-use application of fiber 10. The core radius can depend on the wavelength or wavelength range of the energy to be guided by the fiber, and on whether the fiber is a single or multi-mode fiber. For example, where the fiber is a single mode fiber for guiding visible wavelengths (e.g., between about 400 nm and about 800 nm) the core radius can be in the sub-micron to several micron range (e.g., from about 0.5 µm to about 5 µm). However, where the fiber is a multimode fiber for guiding IR wavelengths (e.g., from about 2 µm to about 15 µm, such as 10.6 µm), the core radius can be in the tens to thousands of microns range (e.g., from about 10 µm to about 2,000 µm, such as about 500 µm to about 1,000 µm). The core radius can be about 5$\lambda$ or more (e.g., about 10$\lambda$ or more, about 20$\lambda$ or more, about 50$\lambda$ or more, about 100$\lambda$ or more), where $\lambda$ is the wavelength of the guided energy.

In the present embodiment, core 20 is hollow. Optionally, the hollow core can be filled with a fluid, such as a gas (e.g., air, nitrogen, and/or a noble gas) or liquid (e.g., an isotropic liquid or a liquid crystal). Alternatively, core 20 can include any material or combination of materials that are rheologically compatible with the materials forming confinement region 20. In certain embodiments, core 20 can include one or more dopant materials, such as those described in U.S. patent application Ser. No. 10/121,452, entitled "HIGH INDEX-CONTRAST FIBER WAVEGUIDES AND APPLICATIONS," filed Apr. 12, 2002 and now published under Pub. No. US-2003-0044158-A1, the entire contents of which are hereby incorporated by reference.

Figure 2A:
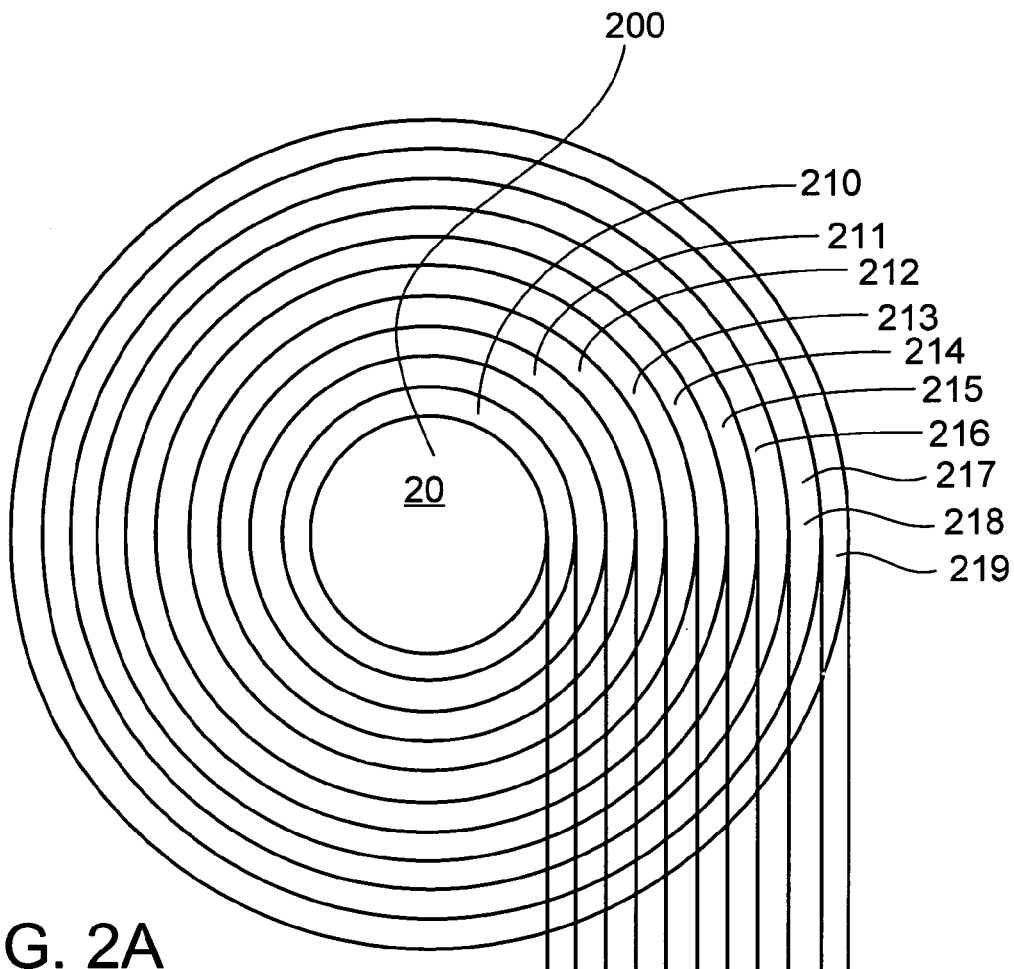
FIG. 2A is a cross-sectional view of a confinement region and a core of a photonic crystal fiber.
Figure 2B:
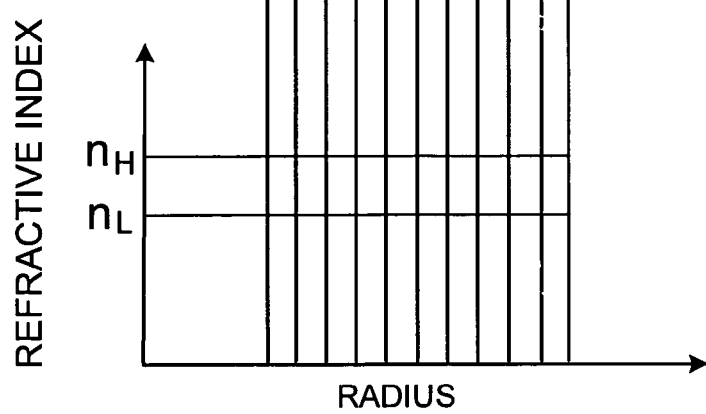
FIG. 2B is a plot of the radial refractive index profile of the confinement region shown in FIG. 2A.

Referring to FIG. 2A, in some embodiments, photonic crystal fiber 10 is a Bragg fiber where the confinement region corresponds to confinement region 200. Confinement region 200 includes multiple annular dielectric layers of differing refractive index (i.e., layers composed of a high index material having a refractive index $n_H$, and layers composed of a low index material having a refractive index $n_L$), indicated as layers 210–219. Here, $n_H > n_L$ and $n_H - n_L$ can be, for example, about 0.01 or more, about 0.05 or more, about 0.1 or more, about 0.2 or more, about 0.5 or more. The radial refractive index profile of confinement region 200 is shown in FIG. 2B. For convenience, only a few of the dielectric confinement layers are shown in FIG. 2A. In practice, confinement region 220 may include many more layers (e.g., about 15 layers or more, about 20 layers or more, about 30 layers or more, about 40 layers or more, about 50 layers or more, about 80 layers or more).

In some embodiments, confinement region 200 can give rise to an omnidirectional bandgap with respect to core 20, wherein the guided modes are strongly confined because, in principle, any EM radiation incident on the confinement region from the core is completely reflected. However, such complete reflection only occurs when there are an infinite number of layers. For a finite number of layers (e.g., about 20 layers), an omnidirectional photonic bandgap may correspond to a reflectivity in a planar geometry of at least 95% for all angles of incidence ranging from 0° to 80° and for all polarizations of EM radiation having frequency in the omnidirectional bandgap. Furthermore, even when fiber 10 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layers (which generally scales with index contrast of the two layers) and the lowest-index constituent of the photonic crystal.

The existence of an omnidirectional bandgap, however, may not be necessary for useful application of fiber 10. For example, in some embodiments, a laser beam used to establish the propagating field in the fiber is a $TEM_{00}$ mode. This mode can couple with high efficiency to the $HE_{11}$ mode of a suitably designed fiber. Thus, for successful application of the fiber for transmission of laser energy, it may only be necessary that the loss of this one mode be sufficiently low. More generally, it may be sufficient that the fiber support only a number of low loss modes (e.g., the $HE_{11}$ mode and the modes that couple to it from simple perturbations, such as bending of the fiber). In other words, photonic bandgap fibers may be designed to minimize the losses of one or a group of modes in the fiber, without necessarily possessing an omnidirectional bandgap.

For a planar dielectric reflector, it is well-known that, for normal incidence, a maximum band gap is obtained for a "quarter-wave" stack in which each layer has equal optical thickness $\lambda/4$, or equivalently $n_{hi} d_{hi} = n_{lo} d_{lo} = \lambda/4$, where $d_{hi/lo}$ and $n_{hi/lo}$ refer to the thickness and refractive index, respectively, of high-index and low-index layers in the stack. Normal incidence, however, corresponds to $\beta=0$, whereas for a cylindrical waveguide the desired modes typically lie near the light line $\omega = c\beta$ (in the limit of large R, the lowest-order modes are essentially plane waves propagating along z-axis, i.e., the waveguide axis). In this case, the quarter-wave condition becomes:

$$d_{hi}\sqrt{n_{hi}^2-1} = d_{lo}\sqrt{n_{lo}^2-1} = \lambda/4 \tag{1}$$

This equation may not be exactly optimal because the quarter-wave condition is modified by the cylindrical geometry, which may require the optical thickness of each layer to vary smoothly with its radial coordinate. In addition, the differing absorption of the high and low index materials can change the optimal layer thicknesses from their quarter-wave values.

In certain embodiments, confinement region 200 includes layers that do not satisfy the quarter-wave condition given in Eq. 1. In other words, one or more of layers 210–219 are thicker or thinner than $d_{\lambda/4}$, where $$d_{\lambda/4} = \frac{\lambda}{4\sqrt{n^2-1}},$$

and n is the refractive index of the layer (i.e., $d_{\lambda/4}$ corresponds to an optical thickness equal to the quarter-wave thickness). For example, one or more layers in the confinement region can have a thickness of about $0.9\, d_{\lambda/4}$ or less (e.g., about $0.8\, d_{\lambda/4}$ or less, about $0.7\, d_{\lambda/4}$ or less, about $0.6\, d_{\lambda/4}$ or less, about $0.5\, d_{\lambda/4}$ or less, about $0.4\, d_{\lambda/4}$ or less, about $0.3\, d_{\lambda/4}$ or less), or about $1.1\, d_{\lambda/4}$ or more (e.g., about $1.2\, d_{\lambda/4}$ or more, about $1.3\, d_{\lambda/4}$ or more, about $1.4\, d_{\lambda/4}$ or more, about $1.5\, d_{\lambda/4}$ or more, about $1.8\, d_{\lambda/4}$ or more, about $2.0\, d_{\lambda/4}$ or more). In some embodiments, all layers in the confinement region can be detuned from the quarter-wave condition. In some embodiments, the thickness of one or more of the high index layers can be different (e.g., thicker or thinner) from the thickness of the other high index layers. For example, the thickness of the innermost high index layer can be different from the thickness of the other high index layers. Alternatively, or additionally, the thickness of one or more of the low index layers can be different (e.g., thicker or thinner) from the thickness of the other low index layers. For example, the thickness of the innermost low index layer can be different from the thickness of the other low index layers.

Detuning the thickness of layers in the confinement region from the quarter-wave condition reduces the attenuation of photonic crystal fiber 10 compared to a test fiber, which refers to a fiber identical to photonic crystal fiber 10, except that the quarter-wave condition is satisfied for all layers in the confinement region (i.e., the test fiber has an identical core, and its confinement region has the same number of layers with the same composition as photonic crystal fiber 10). For example, fiber 10 can have an attenuation for one or more guided modes that is reduced by a factor of about two or more compared to the attenuation of the test fiber (e.g., reduced by a factor of about three or more, about four or more, about five or more, about ten or more, about 20 or more, about 50 or more, about 100 or more).

The thickness of each layer in the confinement region can vary depending on the composition and structure of the photonic crystal fiber. Thickness can also vary depending on the wavelength, mode, or group of modes for which the photonic crystal fiber is optimized. The thickness of each layer can be determined using theoretical and/or empirical methods. Theoretical methods include computational modeling. One computational approach is to determine the attenuation of a fiber for different layer thicknesses and use an optimization routine (e.g., a non-linear optimization routine) to determine the values of layer thickness that minimize the fiber's attenuation for a guided mode. For example, the "downhill simplex method", described in the text *Numerical Recipes in FORTRAN (second edition)*, by W. Press, S. Teukolsky, W. Vetterling, and B Flannery, can be used to perform the optimization.

Such a model should account for different attenuation mechanisms in a fiber. Two mechanisms by which energy can be lost from a guided EM mode are by absorption loss and radiation loss. Absorption loss refers to loss due to material absorption. Radiation loss refers to energy that leaks from the fiber due to imperfect confinement. Both modes of loss contribute to fiber attenuation and can be studied theoretically, for example, using transfer matrix methods and perturbation theory. A discussion of transfer matrix methods can be found in an article by P. Yeh et al., *J. Opt. Soc. Am.*, 68, p. 1196 (1978). A discussion of perturbation theory can found in an article by M. Skorobogatiy et al., *Optics Express*, 10, p. 1227 (2002). Particularly, the transfer matrix code finds propagation constants $\beta$ for the "leaky" modes resonant in a photonic crystal fiber structure. Imaginary parts of $\beta$'s define the modal radiation loss, thus $\text{Loss}_{radiation} \sim \text{Im}(\beta)$. Loss due to material absorption is calculated using perturbation theory expansions, and in terms of the modal field overlap integral it can be determined from $$\text{Loss}_{\text{absorption}} \sim 2\pi\omega \int_0^\infty r\,dr(\alpha \vec{E}_\beta^* \vec{E}_\beta), \qquad (2)$$

where $\omega$ is the radiation frequency, r is the fiber radius, $\alpha$ is bulk absorption of the material, and $\vec{E}_\beta$ is an electric field vector.

Alternatively, the desired mode fields that can propagate in the fiber can be expanded in a suitable set of functions, such as B-splines (see, e.g., *A Practical Guide to Splines*, by C. deBoor). Application of the Galerkin conditions (see, e.g., Computational Galerkin Methods, C. A. J. Fletcher, Springer-Verlag, 1984) then converts Maxwell's equations into a standard eigenvalue-eigenvector problem, which can be solved using the LAPACK software package (freely available, for example, from the netlib repository on the internet, at "http://www.netlib.org"). The desired complex propagation constants, containing both material and radiation losses, are obtained directly from the eigenvalues.

Guided modes can be classified as one of three types: pure transverse electric (TE); pure transverse magnetic (TM); and mixed modes. Loss often depends on the type of mode. For example, TE modes can exhibit lower radiation and absorption losses than TM/mixed modes. Accordingly, the fiber can be optimized for guiding a mode that experiences low radiation and/or absorption loss.

With regard to the composition of confinement region 30, the composition of the high index and low index layers is typically selected to provide a desired refractive index contrast between the layers at the fiber's operational wavelength(s). The composition of each high index layer can be the same or different as other high index layers, just as the composition of each low index layer can be the same or different as other low index layers. Suitable materials for high and low index layers can include inorganic materials such as inorganic glasses or amorphous alloys. Examples of inorganic glasses include oxide glasses (e.g., heavy metal oxide glasses), halide glasses and/or chalcogenide glasses, and organic materials, such as polymers. Examples of polymers include acrylonitrile-butadiene-styrene (ABS), poly methylmethacrylate (PMMA), cellulose acetate butyrate (CAB), polycarbonates (PC), polystyrenes (PS) (including, e.g., copolymers styrene-butadiene (SBC), methylestyrene-acrylonitrile, styrene-xylylene, styrene-ethylene, styrene-propylene, styrene-acylonitrile (SAN)), polyetherimide (PEI), polyvinyl acetate (PVAC), polyvinyl alcohol (PVA), polyvinyl chloride (PVC), polyoxymethylene; polyformaldehyde (polyacetal) (POM), ethylene vinyl acetate copolymer (EVAC), polyamide (PA), polyethylene terephthalate (PETP), fluoropolymers (including, e.g., polytetrafluoroethylene (PTFE), polyperfluoroalkoxythylene (PFA), fluorinated ethylene propylene (FEP)), polybutylene terephthalate (PBTP), low density polyethylene (PE), polypropylene (PP), poly methyl pentenes (PMP) (and other polyolefins, including cyclic polyolefins), polytetrafluoroethylene (PTFE), polysulfides (including, e.g., polyphenylene sulfide (PPS)), and polysulfones (including, e.g., polysulfone (PSU), polyehtersulfone (PES), polyphenylsulphone (PPSU), polyaryalkylsulfone, and polysulfonates). Polymers can be homopolymers or copolymers (e.g., (Co)poly(acrylamide-acrylonitrile) and/or acrylonitrile styrene copolymers). Polymers can include polymer blends, such as blends of polyamides-polyolefins, polyamides-polycarbonates, and/or PES-polyolefins, for example.

Alternatively, or additionally, low-index regions may be fabricated by using hollow structural support materials, such as silica spheres or hollow fibers, to separate high-index layers or regions. Examples of fibers that include such structural supports are described in Published International Application WO 03/058308, entitled "BIREFRINGENT OPTICAL FIBRES," the entire contents of which are hereby incorporated by reference.

In certain embodiments, the confinement region is a dielectric confinement region, being composed of substantially all dielectric materials, such as one or more glasses and/or one or more dielectric polymers. Generally, a dielectric confinement region includes substantially no metal layers.

In some embodiments, the high index layers or low index layers of the confinement region can include chalcogenide glasses (e.g., glasses containing a chalcogen element, such as sulphur, selenium, and/or tellurium). In addition to a chalcogen element, chalcogenide glasses may include one or more of the following elements: boron, aluminum, silicon, phosphorus, sulfur, gallium, germanium, arsenic, indium, tin, antimony, thallium, lead, bismuth, cadmium, lanthanum and the halides (fluorine, chlorine, bromide, iodine).

Chalcogenide glasses can be binary or ternary glasses, e.g., As—S, As—Se, Ge—S, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—S—Tl, As—Se—Tl, As—Te—Tl, As—Se—Ga, Ga—La—S, Ge—Sb—Se or complex, multi-component glasses based on these elements such as As—Ga—Ge—S, Pb—Ga—Ge—S, etc. The ratio of each element in a chalcogenide glass can be varied.

In certain embodiments, in addition or alternative to chalcogenide glass(es), layers 210–219 can include one or more oxide glasses (e.g., heavy metal oxide glasses), halide glasses, amorphous alloys, or combinations thereof.

In general, the absorption of the high and low index layers vary depending on their composition and on the fiber's operational wavelength(s). In some embodiments, the material forming both the high and low index layers can have low absorption. A low absorption material has absorption of about 100 dB/m or less (e.g., about 20 dB/m or less, about 10 dB/m or less, about 5 dB/m or less, about 1 dB/m or less, 0.1 dB/m or less). Examples of low absorption materials include chalcogenide glasses, which, at wavelengths of about 3 microns, exhibit an absorption coefficient of about 4 dB/m. At wavelengths of about 10.6 microns, chalcogenide glasses exhibit an absorption coefficient of about 10 dB/m. As another example, oxide glasses (e.g. lead borosilicate glasses, or silica) can have low absorption for wavelengths between about 1 and 2 microns. Some oxide glasses can have an absorption coefficient of about 1 dB/m to 0.0002 dB/m in this wavelength range.

Alternatively, one or both of the high and low index materials can have high absorption (e.g., about 100 dB/m or more, such as about 1,000 or more, about 10,000 or more, about 20,000 or more, about 50,000 dB/m or more). For example, many polymers exhibit an absorption coefficient of about $10^5$ dB/m for wavelengths between about 3 and about 11 microns. Examples of such polymers include polyetherimide (PEI), polychlorotrifluoro ethylene (PCTFE), perfluoroalkoxyethylene (PFA), and polyethylene naphthalate (PEN). PEI has an absorption of more than about $10^5$ dB/m at 3 microns, while PCTFE, PFA, and PEN have absorptions of more than about $10^5$ dB/m at 10.6 microns.

In some embodiments, the high index material has a low absorption coefficient and the low absorption material has a high absorption coefficient, or vice versa.

A material's absorption can be determined by measuring the relative transmission through at least two different thicknesses, $T_1$ and $T_2$, of the material. Assuming the field in the material decays with thickness T according to $Pe^{-\alpha T}$, with P representing the power incident on the material, the measured transmitted power through thicknesses $T_1$ and $T_2$ will then be $P_1=Pe^{-\alpha T_1}$ and $P_2=Pe^{-\alpha T_2}$. The absorption coefficient $\alpha$ is there obtained as $$\alpha = -\frac{1}{T_2 - T_1}\ln(P_2/P_1).$$

If desired, a more accurate evaluation of $\alpha$ can be obtained by using several thicknesses and performing a least squares fit to the logarithm of the transmitted power.

As discussed previously, materials can be selected for the confinement region to provide advantageous optical properties (e.g., low absorption with appropriate indices of refraction at the guided wavelength(s)). However, the materials should also be compatible with the processes used to manufacture the fiber. In some embodiments, the high and low index materials (e.g., the first and second chalcogenide glasses) should preferably be compatible for co-drawing. Criteria for co-drawing compatibility are provided in aforementioned U.S. patent application Ser. No. 10/121,452, entitled "HIGH INDEX-CONTRAST FIBER WAVEGUIDES AND APPLICATIONS." In addition, the high and low index materials should preferably be sufficiently stable with respect to crystallization, phase separation, chemical attack and unwanted reactions for the conditions (e.g., environmental conditions such as temperature, humidity, and ambient gas environment) under which the fiber is formed, deployed, and used.

Figure 3A:
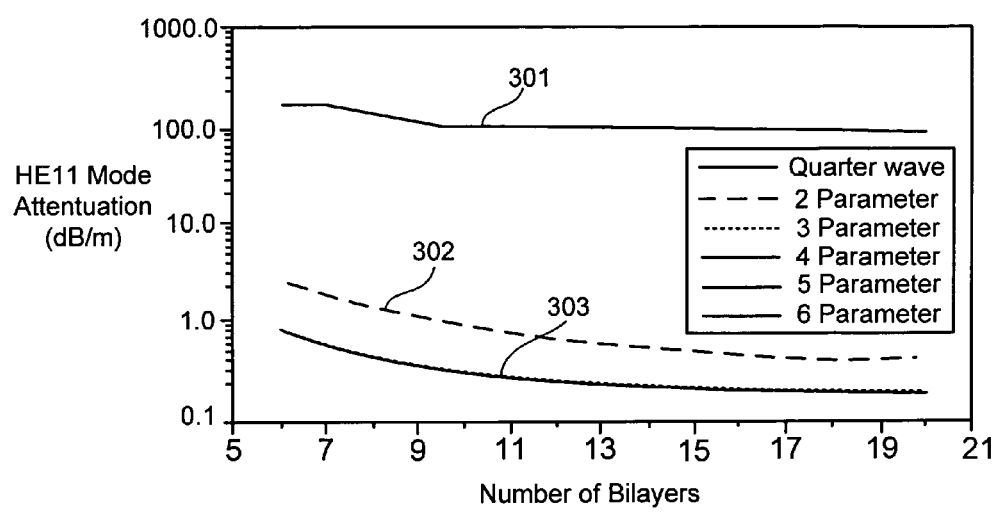
Figure 3B:
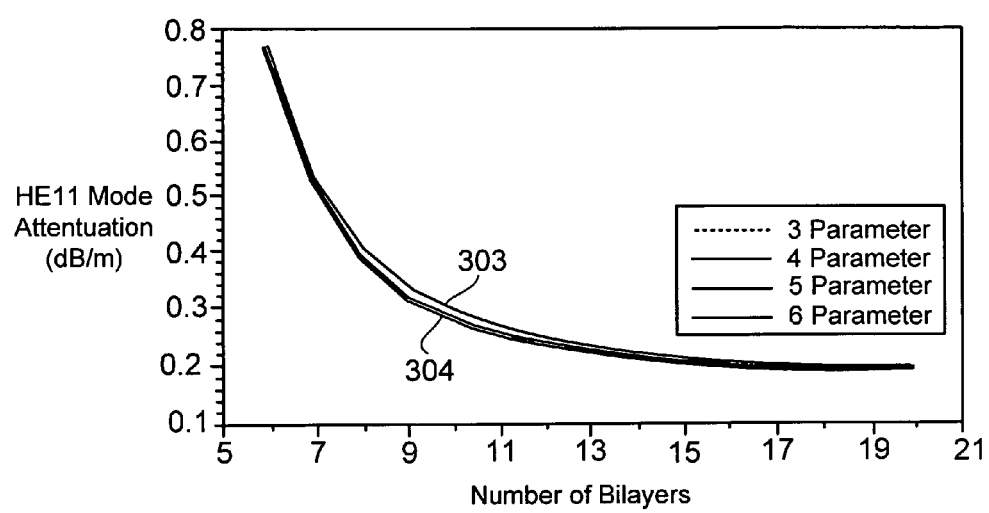
FIG. 3B is a plot showing the same data as FIG. 3A with an expanded y-axis scale.

Referring to FIGS. 3A and 3B, layer thickness optimization results are shown for a photonic crystal fiber where the high index material has a low absorption, and the low index material has a high absorption. For these calculations, the fiber core radius is taken to be 250 µm and the operating wavelength 10.6 µm. The refractive indices of the high and low index materials are taken as:

$$n_H=2.714+1.94\times10^{-6}i \quad (3)$$

$$n_L=1.728+7.77\times10^{-3}i \quad (4)$$

where the subscript "H" refers to the high index, and "L" refers to the low index. The imaginary parts of the high and low indices correspond to material losses of about 10 dB/m and about 40,000 dB/m, respectively, which correspond approximately to the absorption of a chalcogenide glass and a polymer at 10.6 µm. In this embodiment, the innermost layer is a high index layer.

To optimize layer thickness, an initial design for each fiber is obtained from the quarter-wave conditions:

$$t_H = \frac{\lambda}{4\sqrt{Re(n_H)^2 - 1}} \quad (5)$$

$$t_L = \frac{\lambda}{4\sqrt{Re(n_L)^2 - 1}} \quad (6)$$

where $t_H$, $t_L$ denote the thicknesses of the high and low index layers, respectively. The initial condition corresponds to a test fiber. Attenuation was calculated for the $HE_{11}$ mode for different numbers of bilayers (a "bilayer" is a high index layer/low index layer pair).

As shown in FIG. 3A, attenuation for the test fiber (curve 301) is approximately 100–200 dB/m. Curve 302 corresponds to the attenuation of a fiber where all high index layers have the same thickness and all low index layers have the same thickness, but both the high and low index layers are detuned from the quarter-wave condition. The attenuation for this fiber varies from about 3 dB/m to less than 1 dB/m with increasing numbers of bilayers. Because this optimization involves detuning two thicknesses from the quarter-wave condition, it is referred to as a "two-parameter" optimization. The optimization was performed with the "downhill simplex method" referenced above. Additional optimizations were performed allowing the thickness of individual layers to vary in addition to varying the thickness of the high index and low index layers as a group. In particular, the optimization where the innermost layer (i.e., the high index layer adjacent the core) varies independently, in addition to the high and low index layers, is referred to as a "three-parameter" optimization. The three-parameter optimization yielded a further reduction in attenuation over the initial detuning (of all layers). The results of this optimization are shown as curve 303. The attenuation for this fiber varies from about 0.8 dB/m to about 0.2 dB/m with increasing numbers of bilayers. Referring to FIG. 3B, varying additional individual layer thickness (i.e., the innermost low index layer ("four-parameter" optimization), second to innermost high index layer ("five-parameter" optimization), and second to innermost low index layer ("six-parameter" optimization) do not result in a substantial reduction in attenuation compared to the three-parameter optimization. Curves for the four, five, and six-parameter optimization are indicated by numeral 304 in FIG. 3B.

Figure 4:
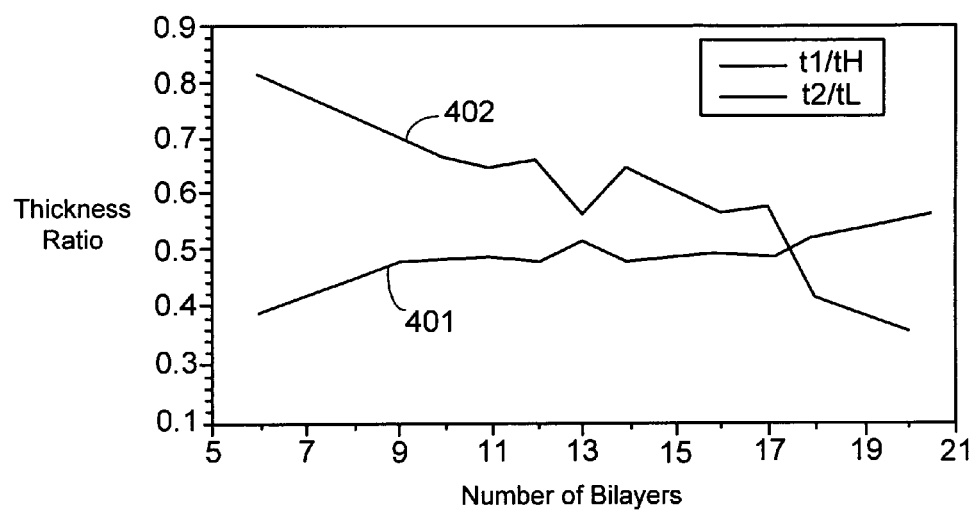

The optimal thickness of individually optimized layers relative to other layers may vary depending on, e.g., the number of bilayers in the fiber. Referring to FIG. 4, for example, the relative layer thickness of the innermost high index layer and low index layer to the other high and low index layers, respectively, for the four-parameter optimization vary depending on the number of bilayers in the fiber. In particular, the relative thickness of the innermost high index layer, $t_1$, to the thickness of the other high index layers, $t_H$, increases as the number of bilayers in the fiber increases (curve 401), whereas the relative thickness of the innermost low index layer, $t_2$, to the thickness of the other low index layers, $t_L$, decreases (curve 402). It is believed that the somewhat jagged nature of the curves in FIG. 4 follows from the relaxed convergence criteria of the optimization software. If the optimization had proceeded further, the curves would be expected to be smooth.

Figure 5:
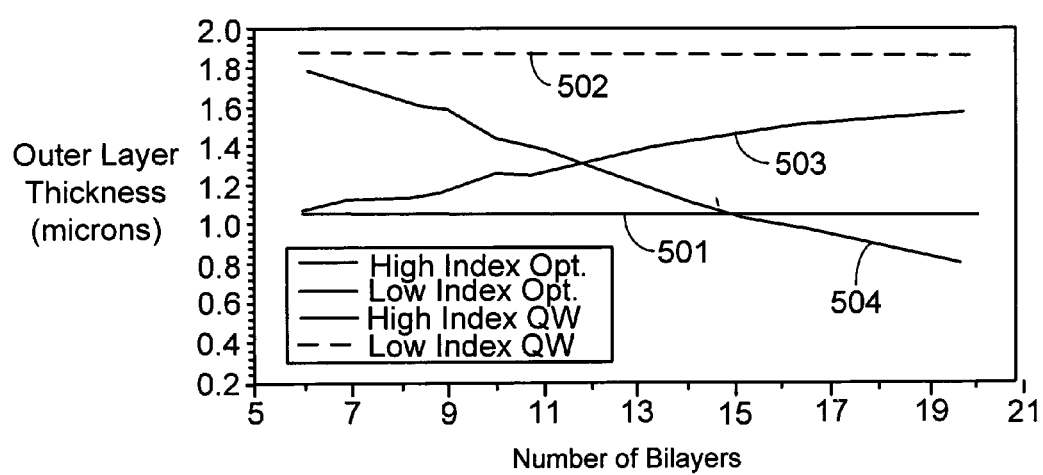

The thickness of layers whose thickness is optimized as a group can also vary as a function of the number of bilayers in the fiber. For example, referring to FIG. 5, which also corresponds to the four-parameter optimization, optimized $t_H$ (curve 503) and optimized $t_L$ (curve 504) vary by an increasing amount from the quarter wave condition as the number of bilayers increases. The quarter wave thicknesses are shown as curves 501 and 502 for the high and low index materials, respectively.

Figure 6:
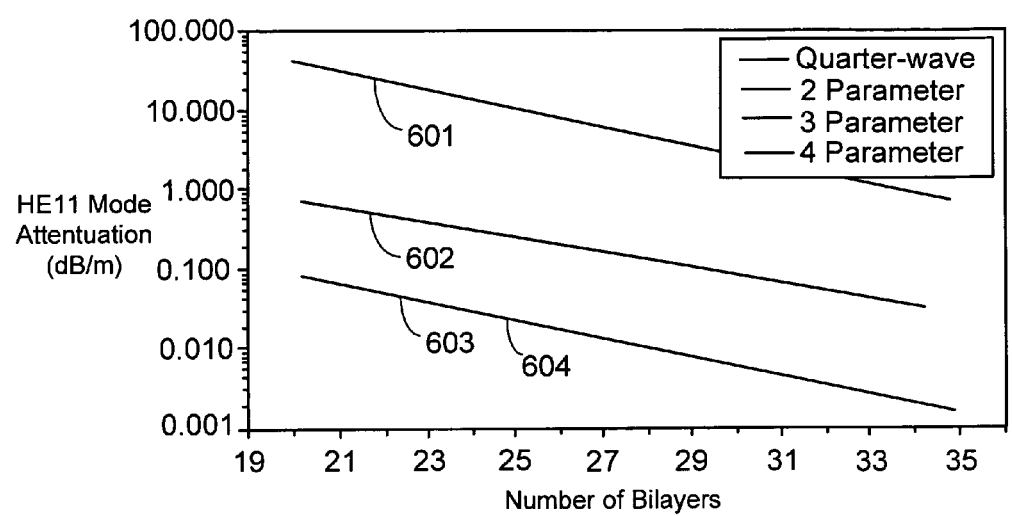
FIG. 6–FIG. 8 are plots comparing various parameters in optimized photonic crystal fibers in which the high and low index layers have a second set of refractive indices. In particular.

Referring to FIG. 6, fiber attenuation is shown for a fiber composed of a low loss high and low index materials, with a relatively small refractive index difference.

$$n_H = 2.714 + 1.94 \times 10^{-6} i \quad (7)$$

$$n_L = 2.300 + 1.94 \times 10^{-6} i \quad (8)$$

The imaginary parts of the high and low indices correspond to material losses of 10 dB/m. These refractive indices correspond to different chalcogenide glasses, for example, the high index glass corresponds to arsenic triselenide, while the low index glass corresponds to arsenic trisulfide. Attenuation is shown for a test fiber (curve 601) and fibers corresponding to a two-parameter optimization (curve 602), a three-parameter optimization (curve 603), and a four-parameter optimization (curve 604). Note that curve 604 obscures curve 603. As for the previous example, substantial improvement (e.g., an order of magnitude or more) in attenuation is observed for the two-parameter optimized fiber relative to the test fiber. Similarly, a substantial reduction in attenuation is observed from the two-parameter optimization to the three-parameter optimization. However, there is no substantial reduction in attenuation from the three-parameter to four-parameter optimization.

Figure 7:
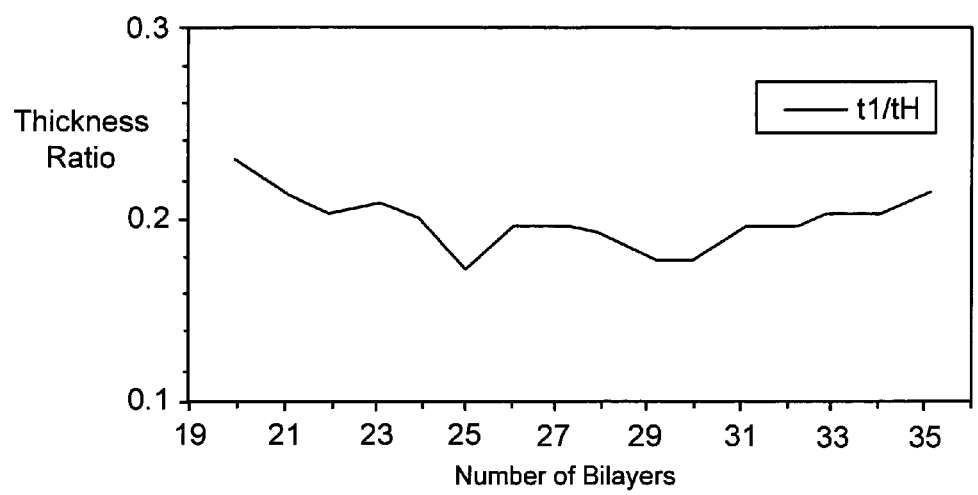

Referring to FIG. 7, for the present materials combination when using a three-parameter optimization, the optimal thickness ratio of the innermost layer, $t_1$, to the thickness of the other high index layers, $t_H$, varies slightly for different numbers of bilayers. In particular, the ratio $t_1/t_H$ varies between about 0.23 and about 0.18 for 20 to 35 bilayers.

Figure 8:
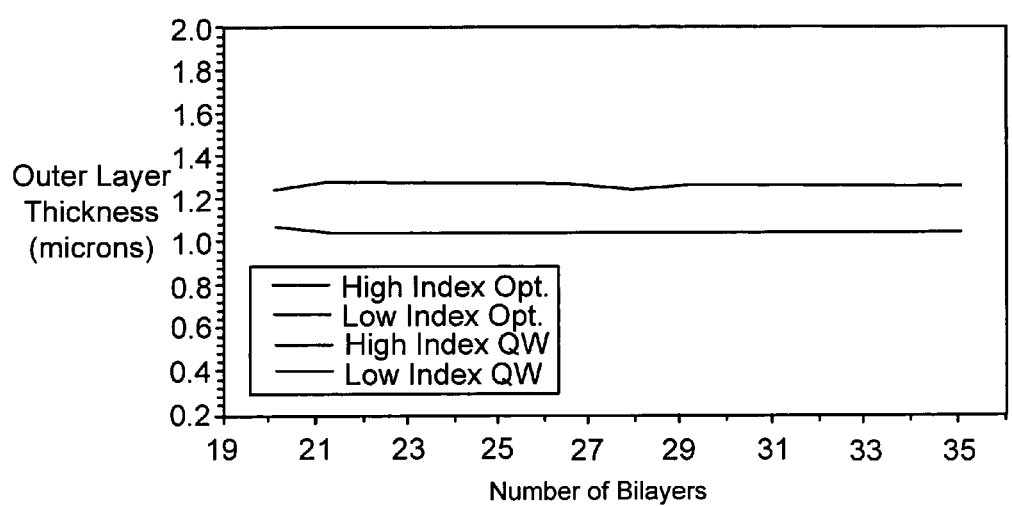

Referring to FIG. 8, when using the four-parameter optimization, there is little difference between $t_H$ and $t_L$ and the quarter-wave thickness for these materials. This is in contrast to the same optimization for the previous refractive indices, where $t_H$ and $t_L$ varied from the quarter-wave thickness and varied as a function of the number of bilayers (see FIG. 5).

Although the foregoing optimization calculations assume that a high index layer is the innermost layer, other embodiments can include fibers in which a low index layer is the innermost layer.

Furthermore, while the foregoing optimization determines an attenuation minimum for a confinement region in which one or more layers are thinner than the quarter-wave thickness, attenuation minima may also be found for confinement regions having one or more layers that are thicker than the quarter-wave thickness. Alternatively, or additionally, while the foregoing optimizations provide low attenuation fibers in which the innermost high and/or low index layers are thinner than the other high and/or low index layers, low attenuation fibers include structures in which the innermost high and/or low index layers are thicker than the other high and/or low index layers. For example, tables I and II compares layer thickness and attenuation for fibers having the same number of bilayers and being formed from the same materials, but where the thickness of the innermost layers relative to the other layers are different. In particular, table I shows a $t_H$, $t_L$, $t_1/t_H$, $t_2/t_L$, and attenuation for the $HE_{11}$ mode determined for using a four-parameter optimization for attenuation minima for $t_1$ and $t_2$ being both thicker and thinner than $t_H$ and $t_L$, respectively. The fiber had 20 bilayers and $n_H$ and $n_L$ were the same as those shown in Eq. 3 and 4. Table II shows the same parameters for a 34 bilayer fiber with $n_H$ and $n_L$ given by Eq. 7 and 8. As was the case for the examples discussed previously, the core radius was 250 μm, and the wavelength was 10.6 μm.

TABLE I

Comparison of layer thickness and loss for confinement region layers thinner (column II) and thicker (column III) than the quarter-wave condition for a 20 bilayer confinement region. Refractive indices for the high and low index layers correspond to Eq. (3) and (4), respectively.

| PARAMETERS | THIN | THICK |
|---|---|---|
| $t_H$ (μm) | 1.59719 | 1.64008 |
| $t_L$ (μm) | 0.81902 | 0.81590 |
| $t_1/t_H$ | 0.47530 | 1.31442 |
| $t_2/t_L$ | 0.59515 | 0.71245 |
| $HE_{11}$ Loss (dB/m) | 0.19415 | 0.24004 |

TABLE II

Comparison of layer thickness and loss for confinement region layers thinner (column II) and thicker (column III) than the quarter-wave condition for a 34 bilayer confinement region. Refractive indices for the high and low index layers correspond to Eq. (7) and (8), respectively.

| PARAMETERS | THIN | THICK |
|---|---|---|
| $t_H$ (μm) | 1.05013 | 1.06830 |
| $t_L$ (μm) | 1.27832 | 1.25834 |
| $t_1/t_H$ | 0.23396 | 1.71421 |
| $t_2/t_L$ | 0.96108 | 1.08297 |
| $HE_{11}$ Loss (dB/m) | 0.0021006 | 0.0022016 |

Furthermore, while the foregoing examples consider optimizing attenuation for the $HE_{11}$ mode, attenuation may also be reduced for other guided modes. Table III and IV, for example, compare the attenuation of different modes of a test fiber and a fiber optimized with four parameters for the $HE_{11}$ mode. For table III, the fiber had 20 bilayers and $n_H$ and $n_L$ were given by Eq. 3 and 4. For table IV, the fiber had 34 bilayers and $n_H$ and $n_L$ were given by Eq. 7 and 8. The core radius was 250 μm, and the wavelength was 10.6 μm.

TABLE III

Comparison of attenuation for different modes of a 20 bilayer test fiber (column II) and a 20 bilayer optimized fiber for the $HE_{11}$ mode. Refractive indices for the high and low index layers correspond to Eq. (3) and (4), respectively.

| MODE | QW LOSS (dB/m) | OPTIMIZED (dB/m) |
|---|---|---|
| $TM_{01}$ | 224.8 | 0.844 |
| $TM_{02}$ | 200.3 | 2.822 |
| $TM_{03}$ | 196.6 | 5.907 |
| $TE_{01}$ | 0.0796 | 0.149 |
| $TE_{02}$ | 0.267 | 0.498 |
| $TE_{03}$ | 0.564 | 1.042 |
| $HE_{11}$ | 102.4 | 0.196 |
| $HE_{12}$ | 7.267 | 0.927 |
| $HE_{13}$ | 3.107 | 1.858 |
| $EH_{11}$ | 207.5 | 0.994 |
| $EH_{12}$ | 197.9 | 3.048 |
| $EH_{13}$ | 195.9 | 6.527 |
| $HE_{21}$ | 175.3 | 0.498 |
| $HE_{22}$ | 19.33 | 1.547 |
| $HE_{23}$ | 8.719 | 2.869 |
| $EH_{21}$ | 201.3 | 1.489 |
| $EH_{22}$ | 196.7 | 3.810 |
| $EH_{23}$ | 195.5 | 7.438 |

TABLE IV

Comparison of attenuation for different modes of a 34 bilayer test fiber (column II) and a 34 bilayer fiber optimized for the $HE_{11}$ mode. Refractive indices for the high and low index layers correspond to Eq. (7) and (8), respectively.

| MODE | QW LOSS (DB/M) | OPTIMIZED (DB/M) |
|---|---|---|
| $TM_{01}$ | 1.948 | $9.71 \times 10^{-3}$ |
| $TM_{02}$ | 1.620 | 0.0324 |
| $TM_{03}$ | 1.586 | 0.0678 |
| $TE_{01}$ | $9.24 \times 10^{-5}$ | $9.46 \times 10^{-4}$ |
| $TE_{02}$ | $3.10 \times 10^{-4}$ | $3.15 \times 10^{-3}$ |
| $TE_{03}$ | $6.54 \times 10^{-4}$ | $6.53 \times 10^{-3}$ |
| $HE_{11}$ | 0.964 | $2.10 \times 10^{-3}$ |
| $HE_{12}$ | 0.0579 | $9.42 \times 10^{-3}$ |
| $HE_{13}$ | 0.0224 | 0.0170 |
| $EH_{11}$ | 1.673 | 0.0112 |
| $EH_{12}$ | 1.598 | 0.0355 |
| $EH_{13}$ | 1.577 | 0.0768 |
| $HE_{21}$ | 1.558 | $5.34 \times 10^{-3}$ |
| $HE_{22}$ | 0.155 | 0.0160 |
| $HE_{23}$ | 0.0667 | 0.0278 |
| $EH_{21}$ | 1.619 | 0.0166 |
| $EH_{22}$ | 1.586 | 0.0436 |
| $EH_{23}$ | 1.569 | 0.0868 |

While the foregoing examples pertain to specific fiber compositions and at a specific wavelength, the methods used to determine the optimized structures can be applied to other compositions, wavelengths and/or modes. In general, to obtain an optimized structure, one only should be able to evaluate the fiber's loss as a function of the various parameters that define the structure. For example, the structure of a holey fiber can be defined by its core size, lattice spacing, air-filling fraction, and number of layers. To optimize this structure, one can vary all these parameters until values that minimize the loss are obtained. The loss of a structure can be determined by solving the appropriate form of Maxwell's equations.

While photonic crystal fiber 200 has a circular cross-section, with core 210 having a circular cross-section and confinement region 220 (and layers therein) having an annular cross-section, in general, photonic crystal fiber's can different geometric cross-section (e.g., a rectangular or a hexagonal cross-section). Furthermore, as mentioned below, the layers of confinement region 220 may include multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between region 220 and 210, however, is defined by a change in index. The change may be caused by the interface of two different dielectric materials or by different dopant concentrations in the same dielectric material (e.g., different dopant concentrations in silica).

Figure 9A:
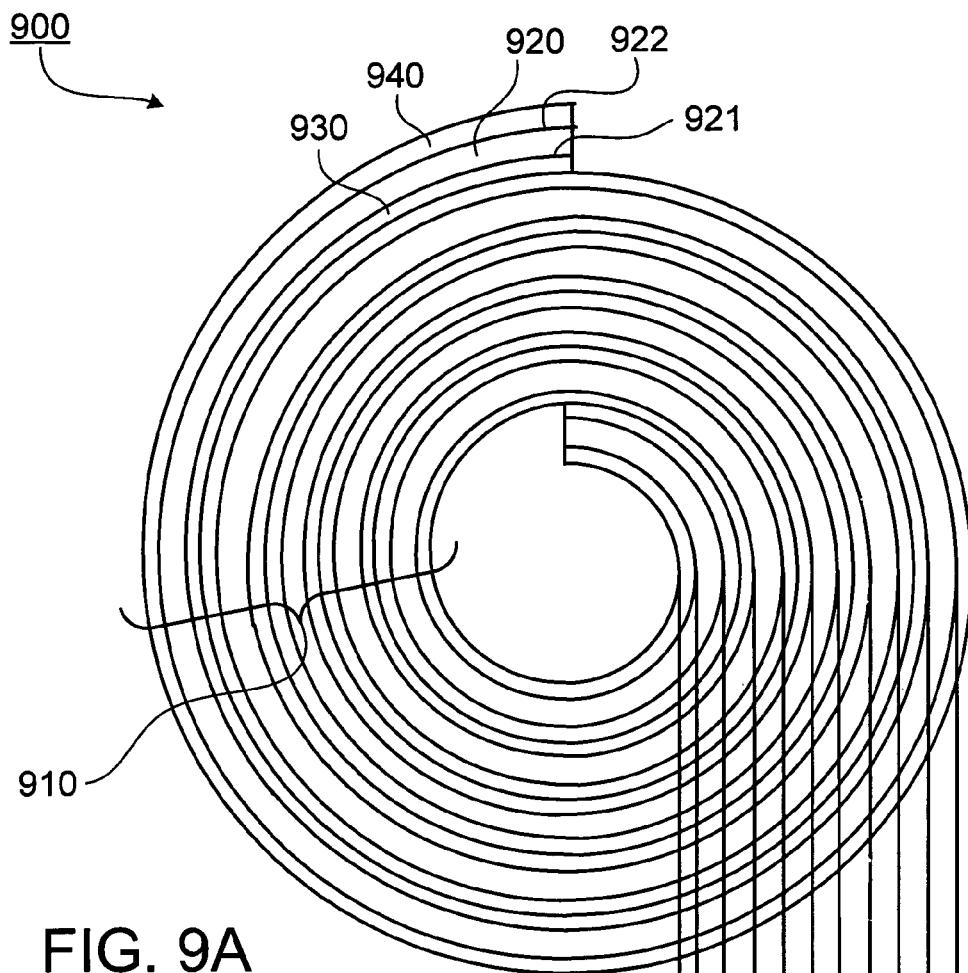
FIG. 9A is a cross-sectional view of an embodiment of confinement region and core of a photonic crystal fiber having a spiral cross-section.
Figure 9B:
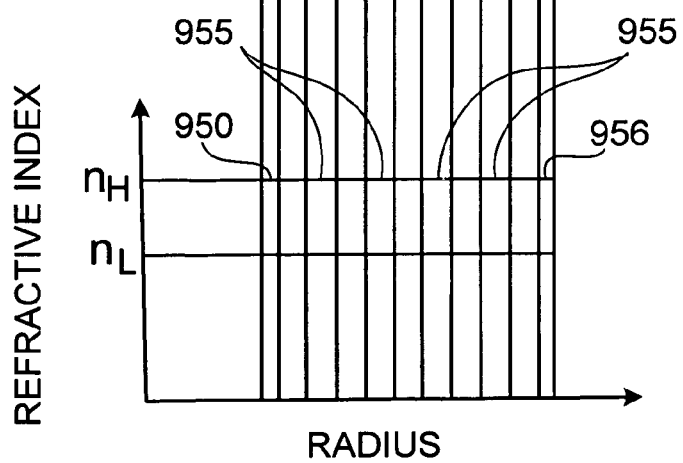
FIG. 9B is a plot of the radial refractive index profile of the confinement region shown in FIG. 9A.

Embodiments can include Bragg fibers that do not have annular cross-sections (i.e., do not have cross-sectional profiles which are symmetric with respect to rotations about a waveguide axis). For example, with reference to FIGS. 9A and 9B, in some embodiments, a photonic crystal fiber 900 can include a confinement region 910 which has a spiral cross section. Confinement region 910 is formed from a single low index substrate 920 with both substrate surfaces (921 and 922) coated with layers 930 and 940 of a high index material. After coating, substrate 920 is wrapped to form a spiral structure. Referring to FIG. 9B, the radial refractive index profile corresponds to a multilayer Bragg configuration, with alternating portions of high and low refractive indices. An innermost high index portion 950 is half the radial thickness of the other high index portions 955, resulting in photonic crystal fiber 900 having lower attenuation than a comparable test fiber. Furthermore, the outermost high index portion 956 is also half the thickness of portions 955. The optimization of layer thicknesses is thus performed under the constraints that the first and last high index layers have half the thickness of the other high index layers. Varying the relative thickness of the high index layers when depositing them on the substrate surfaces can vary the relative thickness of portions 950, 955, and 956. Examples of photonic crystal fibers having spiral confinement regions are further described in U.S. patent application Ser. No. 10/196,403, entitled "METHOD OF FORMING REFLECTING DIELECTRIC MIRRORS," the entire contents of which is hereby incorporated by reference.

Figure 10A:
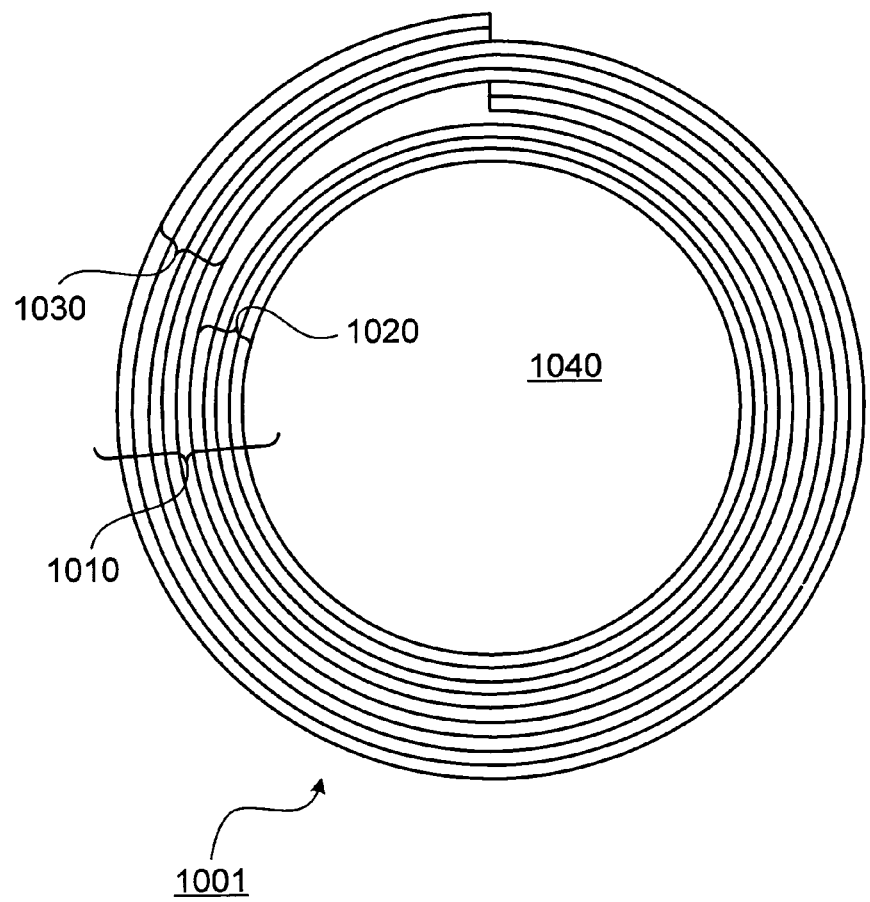
FIG. 10A is a cross-sectional view of an embodiment of a photonic crystal fiber having a confinement region that includes a spiral portion and anon-spiral portion.
Figure 10B:
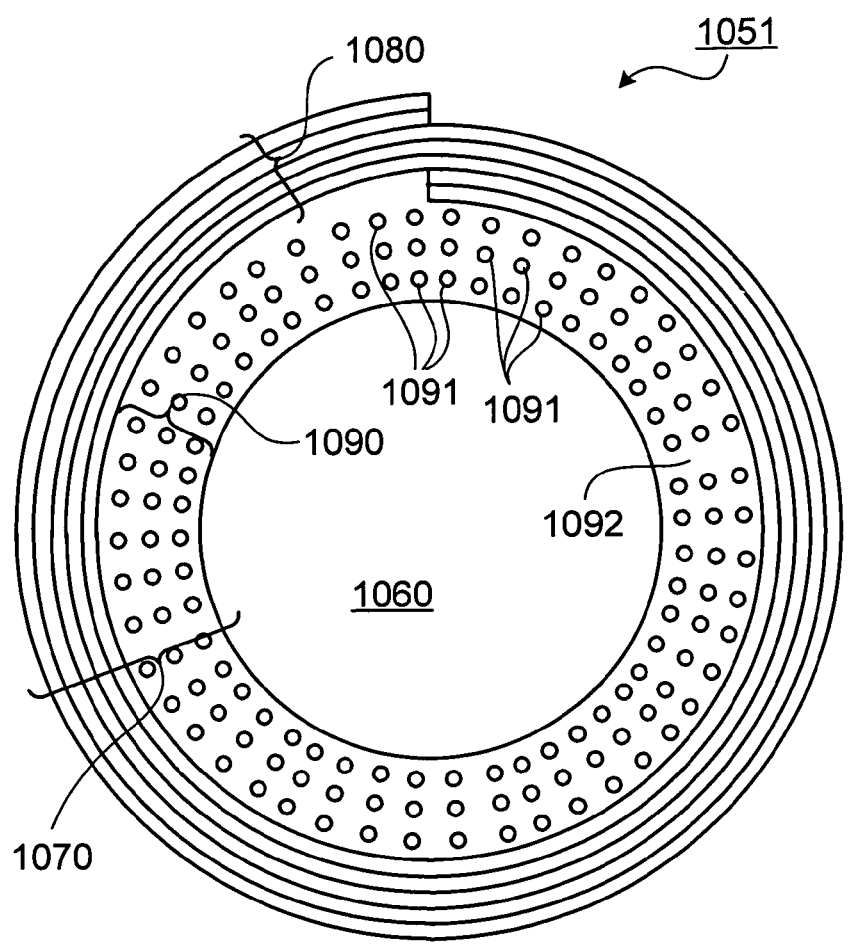
FIG. 10B is a cross-sectional view of another embodiment of a photonic crystal fiber having a confinement region that includes a spiral portion and a non-spiral portion.

Referring to FIG. 10, in some embodiments, a photonic crystal fiber 1001 can include a confinement region 1010 that includes a spiral portion 1030 and an annular portion 1020. The number of layers in annular portion 1020 and spiral portion 1030 (along a radial direction from the fiber axis) can vary as desired. In some embodiments, annular portion can include a single layer. Alternatively, annular portion 1020 can include multiple layers (e.g., two or more layers, three or more layers, four or more layers, five or more layers, ten or more layers).

In embodiments where annular portion 1020 includes more than one layer, the optical thickness of each layer may be the same or different as other layers in the annular portion. In some embodiments, one or more of the layers in annular portion 1020 may have an optical thickness corresponding to the quarter wave thickness (i.e., as given by Eq. (1)). Alternatively, or additionally, one or more layers of annular portion 1020 can have a thickness different from the quarter wave thickness. Layer thickness can be optimized to reduce (e.g., minimize) attenuation of guided radiation using the optimization methods disclosed herein.

In some embodiments, annular portion 1020 can be formed from materials that have a relatively low absorption at the guided wavelength (or wavelengths). For example, annular portion 1020 can include one or more layers of chalcogenide glasses that have low absorption at infrared wavelengths.

In certain embodiments, annular portion 1020 can be formed from materials that have relatively low concentrations of defects that would scatter and/or absorb radiation guided by photonic crystal fiber 1001. For example, annular portion 1020 can include one or more glasses with relatively low concentrations of inhomogeneities and/or impurities. Inhomogeneities and impurities can be identified using optical or electron microscopy, for example. Raman spectroscopy, glow discharge mass spectroscopy, sputtered neutrals mass spectroscopy or Fourier Transform Infrared spectroscopy (FTIR) can also be used to monitor inhomogeneities and/or impurities in photonic crystal fibers.

In certain embodiments, annular portion 1020 is formed from materials with a lower concentration of defects than spiral portion 1030. In general, these defects include both structural defects (e.g., delamination between layers, cracks) and material inhomogeneities (e.g., variations in chemical composition and/or crystalline structure).

Photonic crystal fiber 1001 can be prepared by depositing one or more annular layers onto a surface of a cylinder having a spiral cross-section to form a preform. The photonic crystal fiber can then be drawn from the preform.

The spiral cylinder can be prepared by rolling a planar multilayer film into a spiral and consolidating the spiral by fusing (e.g., by heating) the adjacent layers of the spiral together. In some embodiments, the planar multilayer film can be rolled into a spiral around a mandrel (e.g., a glass cylinder or rod), and the mandrel can be removed (e.g., by etching or by separating the mandrel from the spiral sheath and slipping it out of the sheath) after consolidation to provide the spiral cylinder. The mandrel can be formed from a single material, or can include portions of different materials. For example, in some embodiments, the mandrel can be coated with one or more layers that are not removed after consolidation of the rolled spiral structure. As an example, a mandrel can be formed from a first material (e.g., a silicate glass) in the form of a hollow rod, and a second material (e.g., another glass, such as a chalcogenide glass) coated onto the outside of the hollow rod. The second material can be the same as one of the materials used to form the multilayer film. After consolidation, the first material is etched, and the second material forms part of the fiber preform.

In some embodiments, additional material can be disposed on the outside of the wrapped multilayer film. For example, a polymer film can be wrapped around the outside of the spiral, and subsequently fused to the spiral to provide an annular polymer layer (e.g., a cladding). In certain embodiments, both the multilayer film and an additional film can be wrapped around the mandrel and consolidated in a single fusing step. In embodiments, the multilayer film can be wrapped and consolidated around the mandrel, and then the additional film can be wrapped around the fused spiral and consolidated in a second fusing step. The second consolidation can occur prior to or after etching the mandrel. Optionally, one or more additional layers can be deposited (e.g., using CVD) within the spiral prior to wrapping with the additional film.

Methods for preparing spiral articles are described in U.S. patent application Ser. No. 10/733,873, entitled "FIBER WAVEGUIDES AND METHODS OF MAKING SAME," filed on Dec. 10, 2003, the entire contents of which are hereby incorporated by reference.

Annular layers can be deposited onto a surface of the spiral cylinder using a variety of deposition methods. For example, where the spiral portion is between the annular portion and the core, material can be evaporated or sputtered onto the outer surface of the spiral article to form the preform.

In embodiments where the annular portion of the photonic crystal fiber is between the spiral portion and the core, material can be deposited on the inner surface of the spiral article by, for example, chemical vapor deposition (e.g., plasma enhanced chemical vapor deposition). Methods for depositing layers of, for example, one or more glasses onto an inner surface of a cylindrical preform are described in U.S. patent application Ser. No. 10/720,453, entitled "DIELECTRIC WAVEGUIDE AND METHOD OF MAKING THE SAME," filed on Nov. 24, 2003, the entire contents of which are hereby incorporated by reference.

In general, a confinement region may include photonic crystal structures different from a multilayer configuration. For example, while photonic crystal fiber 1001 has a confinement region that includes both a spiral portion and annular portion, in some embodiments, photonic crystal fibers can include portions with other non-spiral structure. For example, referring to FIG. 10B, in certain embodiments, a photonic crystal fiber 1051 that has a confinement region 1070 (surrounding a hollow core 1060) that includes a spiral portion 1080 and a holey portion 1090. Holey portion 1090 is composed of a solid cylinder 1092 perforated by a number of holes (some labeled 1091) that extend along the fiber's axis. Holes 1091 are arranged along concentric circles, providing a variation in the radial refractive index of holey portion 1090 of confinement region 1070.

Solid cylinder 1092 can be formed form any material compatible with the process used to manufacture photonic crystal fiber 1051. For example, in some embodiments, solid cylinder 1092 can be formed from a material that can be co-drawn with spiral portion 1080. In certain embodiments, solid cylinder 1092 is formed from a polymer or a glass (e.g., a chalcogenide glass).

The diameter of holes 1091 can be selected to provide a desired refractive index profile for holey portion 1090. The diameter for each hole can be the same or different. In some embodiments, the diameters of holes arranged along different concentric circles are different. The diameter of the holes can be selected to provide a structure having optimized loss at the guided wavelength(s), as discussed previously.

In some embodiments, photonic crystal fiber 1051 is formed by spirally wrapping a holey preform with a multilayer sheet and fusing the wrapped sheet to the holey preform at an elevated temperature. The fused structure is a preform, which can be drawn down into a fiber.

Figure 15A:
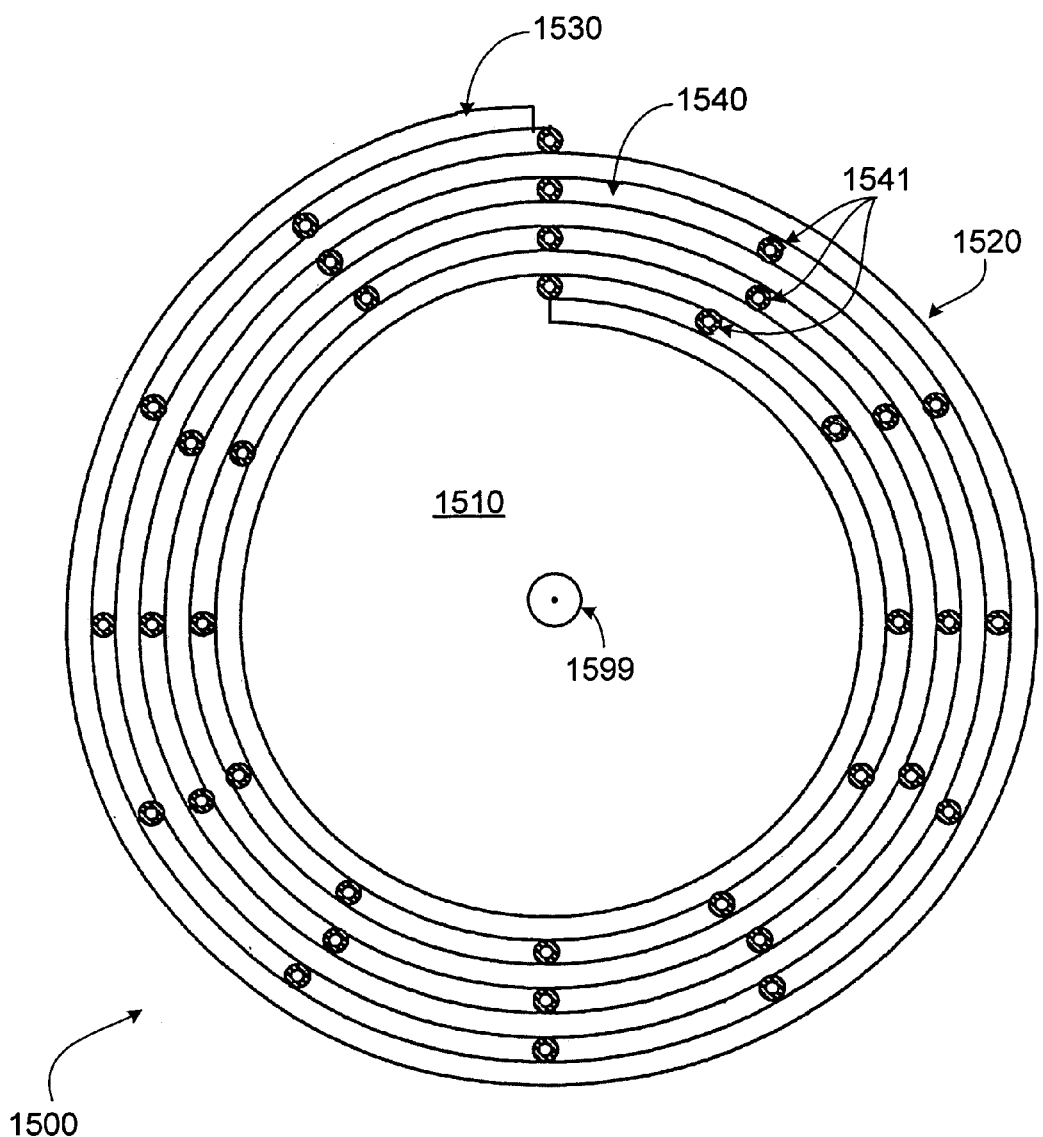
FIG. 15A is a cross-sectional view of an embodiment of a photonic crystal fiber having a confinement region that includes a holey spiral portion.
Figure 15B:
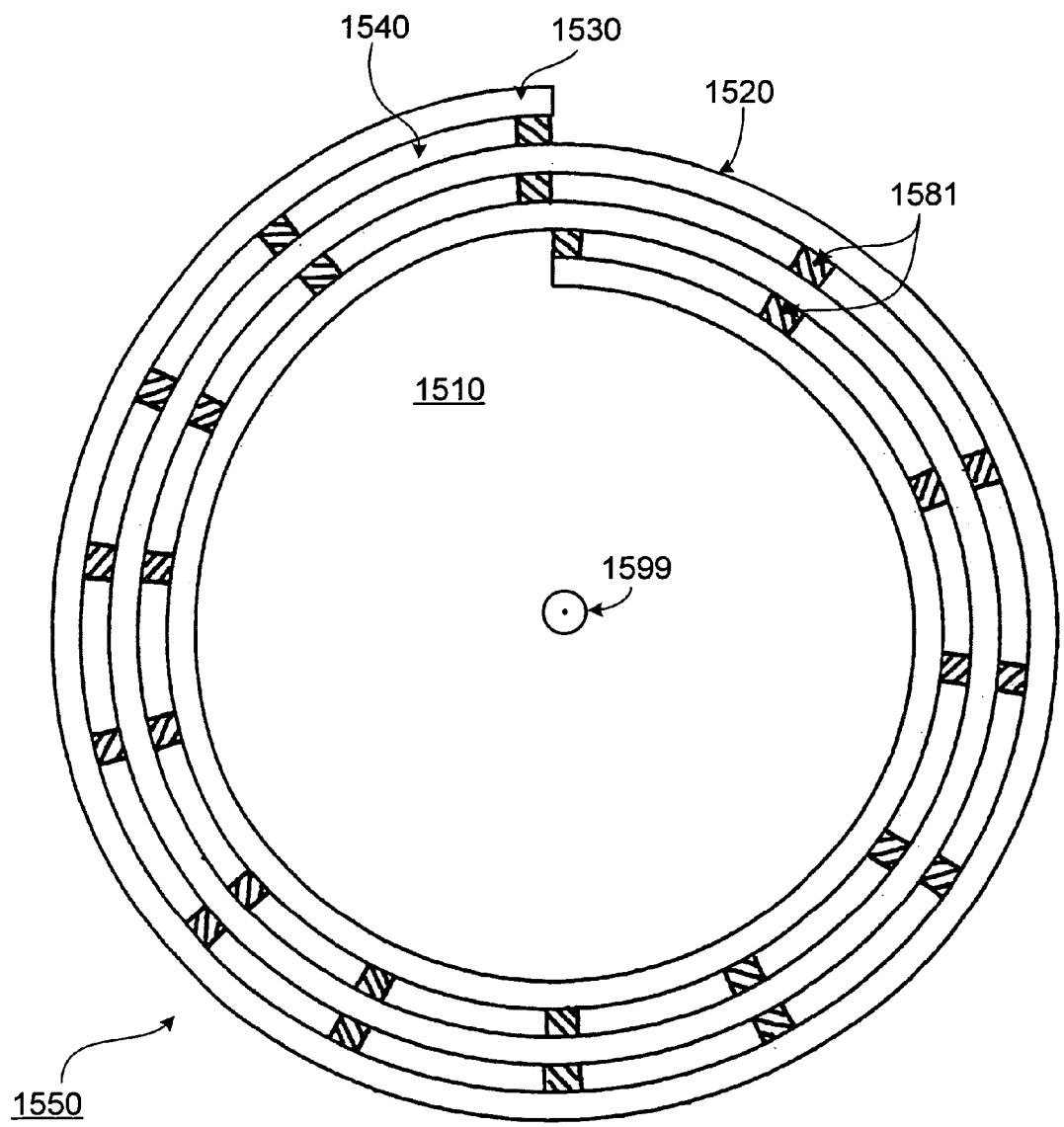
FIG. 15B is a cross-sectional view of another embodiment of a photonic crystal fiber having a confinement region that includes a holey spiral portion.

While photonic crystal fiber 1001 and 1051 are examples of fiber's having a hybrid confinement region (e.g., having a spiral and non-spiral portion), other embodiments of non-hybrid confinement regions are also considered. For example, referring to FIG. 15A, in some embodiments, a photonic crystal fiber 1500 includes a hollow core 1510 and a spiral confinement region 1520 that includes a single layer 1530 wound in a spiral, wherein adjacent layers of the spiral are separated by a gap 1540. Core 1510 and confinement region 1520 extend along a waveguide axis 1599. Rods 1541 support gap 1540. Referring also to FIG. 15B, alternatively, in a photonic crystal fiber 1550, gap 1540 is supported by posts 1581. Rods 1541 and posts 1581 are generically referred to as spacers.

The thickness of the spacers can vary as desired. Generally, the thickness of spacers is selected to provide a desired radial thickness for gap 1540. In some embodiments, the thickness of the spacers is uniform. Alternatively, in certain embodiments, the thickness of the spacers varies through the confinement region. For example, the thickness of the spacers nearest core 1510 can be different from the other spacers. In some embodiments, the thickness of the spacers can vary to provide a structure having optimized loss at the guided wavelength(s), as discussed previously.

Rods 1541 and/or posts 1581 can be spaced in an organized or random fashion. In an example of organized arrangement, the spacers are position at regular azimuthal angles with respect to axis 1599 of the photonic crystal fiber. Typically, the density of the spacers is selected to provide sufficient support for gap 1540 (e.g., so that gap 1540 is substantially uniform throughout confinement region 1520). The spacers can extend along axis 1599 the entire length of the fiber, or for a portion of the fiber length. Rods 1541 and/or spacers 1581 and layer 1530 can be formed from the same material or from different materials.

Photonic crystal fiber 1500 and 1550 can be formed by depositing rods or other spacers onto a sheet of material, rolling the sheet into a spiral (e.g., around a mandrel), and fusing spiral structure to form a preform. Subsequently, photonic crystal fiber can be drawn from the preform. Alternatively to depositing spacers, in some embodiments, spacers can be etched from a continuous layer of material, for example, deposited onto a substrate layer that is subsequently rolled into a spiral.

In some embodiments, rather than the Bragg configuration, which is an example of a one-dimensionally periodic photonic crystal (in the planar limit), in some embodiments, at least a portion of the confinement region may be selected to form a two-dimensionally periodic photonic crystal (in the planar limit), such as an index modulation corresponding to a honeycomb structure. See, for example, R. F. Cregan et al., *Science* Vol. 285, pp. 1537–1539, 1999. Furthermore, even in a Bragg-like configuration, the high-index layers may vary in index and thickness, and/or the low-index layers may vary in index and thickness. In general, the confinement region may be based on any index modulation that provides sufficiently low radiation loss at the guided wavelengths.

Figure 11:
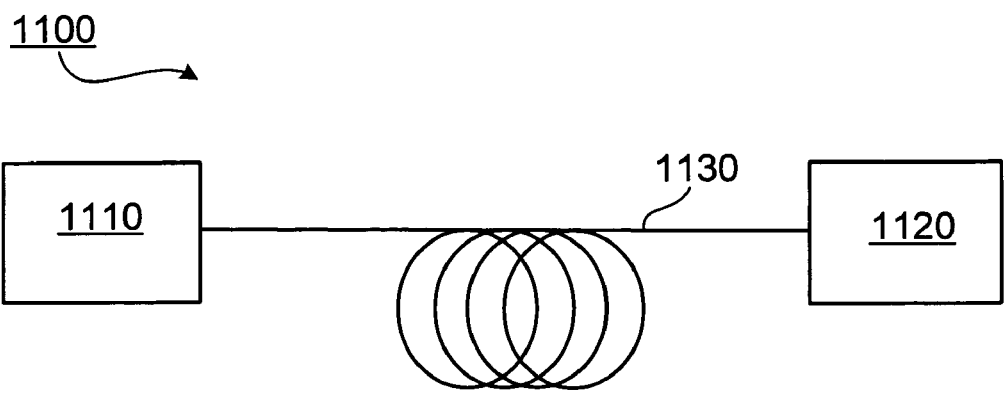
FIG. 11 is a schematic diagram of an optical telecommunication system that implements photonic crystal fibers described herein.

The photonic crystal fibers described herein may be used in a variety of applications. In some embodiments, photonic crystal fibers may be used to guide radiation between a source and a detector. FIG. 11 shows a schematic diagram of a system 1100 including a source 1110 and a detector 1120, which are coupled to one another by a photonic crystal fiber 1130. In certain embodiments, system 1100 is an optical telecommunication system and photonic crystal fiber 1130 serves as an optical transmission line to guide optical signals between source 1110 and detection system 1120. In general, the optical transmission line may include one or more other segments in addition to photonic crystal fiber 1130. Source 1110 may be the original source of an optical signal directed along the transmission line or it may be an intermediate node that redirects the optical signal to the transmission line, optically amplifies it, and/or electronically detects it and optically regenerates it. Furthermore, source 1110 may include components for multiplexing or demultiplexing multiple optical signals at different wavelengths. Similarly, detector 1120 may be the final destination for the optical signal transmitted along the transmission line, or it may be an intermediate node that redirects, optically amplifies, and/or electrically detects and optically regenerates the optical signal. In addition, detector 1120 may also include components for multiplexing or demultiplexing multiple optical signals at different wavelengths. The optical signal transmitted along the transmission line may be a WDM signal that includes multiple signals at corresponding wavelengths. Suitable wavelengths for the system include those within a range of about 1.2 microns to about 1.7 microns, which corresponds to many long-haul systems in use today, as well those within a range of about 0.7 microns to about 0.9 microns, which corresponds to some metro systems currently being considered.

Because of their small losses, the photonic crystal fibers described herein may provide one or more advantages when used as the transmission fiber in an optical telecommunications system. Because the losses are small, the lengths of the transmission line can be made larger as periodic amplification is less necessary. For example, the losses may be smaller than 1 dB/km, smaller than 0.1 dB/km, or even smaller than 0.01 dB/km. Moreover, because FWM is reduced, WDM channel spacing in the fiber can be made smaller.

In some embodiments, system 1100 may be a diagnostic tool. For example, photonic crystal fiber 1130 can be used as a sample cell in a gas-phase spectrometer, where the hollow core of fiber 1130 is filled with a sample gas. Radiation launched into fiber 1130 interacts with the gas. Typically, the amount of radiation at different wavelengths depends on the composition of the gas in the core. Thus, by monitoring the intensity of radiation exiting the fiber at different wavelengths, one can determine the composition of the gas. In such embodiments, detector 1120 can be connected to a processor (e.g., a computer), which performs an analysis of a signal generated by detector 1120 in response to radiation from the source. An example of a gas phase spectrometer utilizing a hollow fiber is described by C. Charlton et al., in *IEE Proc.-Optoelectron.*, Vol. 150, No. 4, pp. 306–309.

Figure 12:
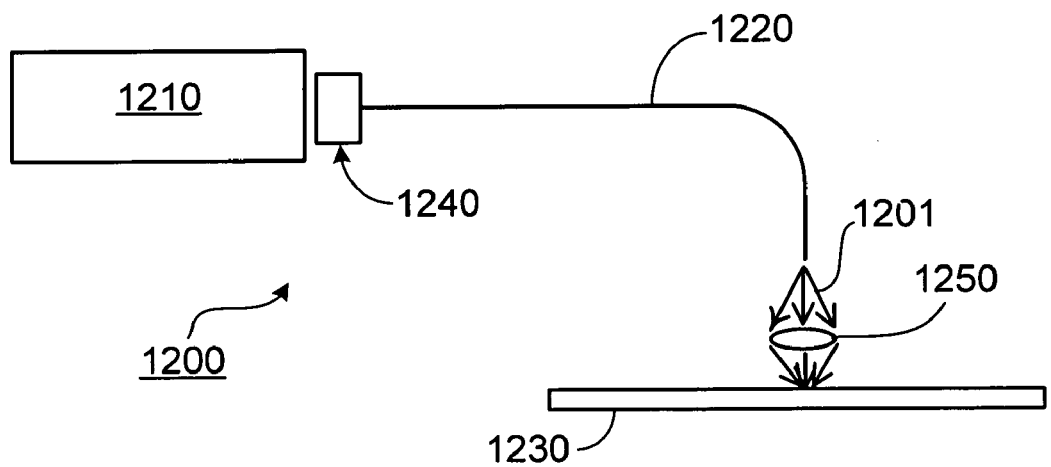
FIG. 12 is a schematic diagram of a laser system that implements photonic crystal fibers described herein.

In some embodiments, a photonic crystal fiber can be used to deliver laser radiation to a target. For example, referring to FIG. 12, a laser system 1200 includes a laser 1210 and a photonic crystal fiber 1220 for guiding electromagnetic (EM) energy from the laser to a target 1230 (e.g., a sheet of steel or a patient) remote from the laser. Radiation is coupled from laser 1210 into fiber 1220 using a coupler 1240. Laser system 1200 also includes a focusing element 1250 (e.g., a lens or combination of lenses) that focuses radiation 1201 emerging from photonic crystal fiber 1220 onto target 1230. The radiation can, for example, be used to cut, clean, ablate, coagulate, form, liquefy, engrave and/or weld material at target 1230. For example, in forming applications, laser radiation can be directed to a metal sheet in order to thermal stress a portion of the sheet, which causes the sheet to bend.

Laser 1210 can be a continuous wave or pulsed laser. The distance between laser 1210 and target 1230 can vary depending on the specific application, and can be on the order of several meters or more (e.g., about 10 m or more, about 20 m or more, about 50 m or more, about 100 m or more).

Laser system 1200 can operate at UV, visible, or infrared (IR) wavelengths. In some embodiments, photonic crystal fiber 1220 is configured to guide IR energy emitted by laser 1210, and the energy has a wavelength between about 0.7 microns and 20 microns (e.g., between about 2 to 5 microns or between about 8 to 12 microns). In some embodiments, laser 1210 is a $CO_2$ laser and the radiation has a wavelength of about 6.5 microns or 10.6 microns. Other examples of lasers which can emit IR energy include Nd:YAG lasers (e.g., at 1.064 microns) Er:YAG lasers (e.g., at 2.94 microns), Er, Cr: YSGG (Erbium, Chromium doped Yttrium Scandium Gallium Garnet) lasers (e.g., at 2.796 microns), Ho:YAG lasers (e.g., at 2.1 microns), free electron lasers (e.g., in the 6 to 7 micron range), and quantum cascade lasers (e.g., in the 3 to 5 micron range).

The power emitted from laser 1210 at the guided wavelength can vary. Although the laser power can be relatively low, e.g., mW, in many applications the laser system is operated at high powers. For example, the laser output intensity can be about one Watt or more (e.g., about five Watts or more, about 10 Watts or more, about 20 Watts or more). In some applications, the laser output energy can be about 100 Watts or more (e.g., about 200 Watts or more, about 300 Watts or more, about 500 Watts or more, about 1 kilowatt or more).

For high power systems, the power density guided by fiber 1020 can be relatively high. For example, power density in the fiber can be about $10^5$ W/cm$^2$ or more, such as about $10^6$ W/cm$^2$ or more, about $10^7$ W/cm$^2$ or more, about $10^8$ W/cm$^2$ or more, about $10^9$ W/cm$^2$ or more, about $10^{10}$ W/cm$^2$ or more.

Fiber 1220 can have relatively low losses at the guided wavelength (e.g., about 10 dB/m or less, about 5 dB/m or less, about 2 dB/m or less, about 1 dB/m or less, about 0.5 dB/m or less, about 0.2 dB/m or less). Due to the low loss, only a relatively small amount of the guided energy is absorbed by the fiber, allowing the fiber to guide high power radiation without substantial damage due to heating.

Coupler 1240 can be any coupler suitable for the wavelength and intensity at which the laser system operates. One type of a coupler is described by R. Nubling and J. Harrington in "Hollow-waveguide delivery systems for high-power, industrial $CO_2$ lasers," *Applied Optics*, 34, No. 3, pp. 372–380 (1996). Other examples of couplers include one or more focusing elements, such as one or more lenses. Coupling efficiency can be high. For example, coupler 140 can couple about 70% or more of the laser output into a guided mode in the fiber (e.g., about 80% or more, about 90% or more, about 95% or more, about 98% or more). Coupling efficiency refers to the ratio of power guided away by the desired mode to the total power incident on the fiber.

Figure 13:
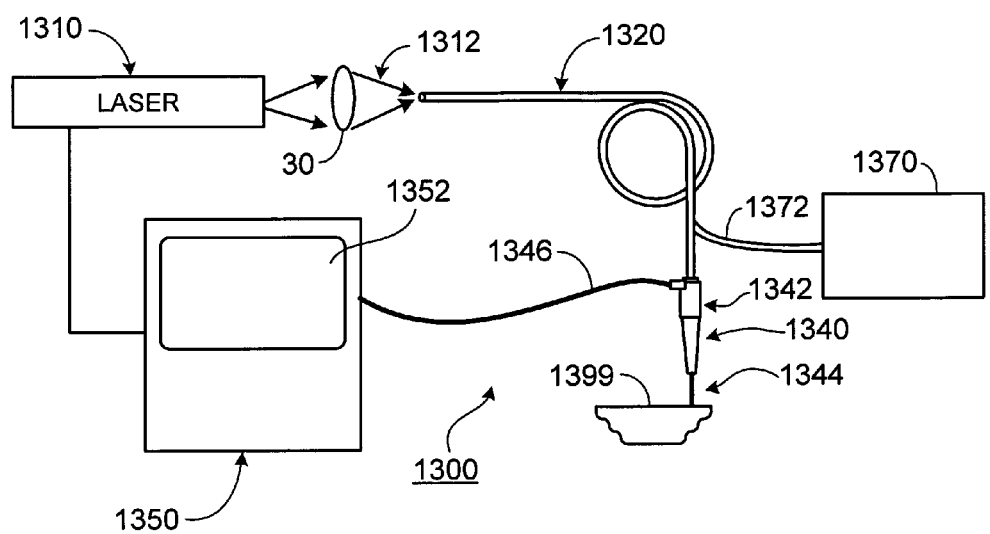
FIG. 13 is a schematic diagram of a medical laser system that includes a photonic crystal fiber.

As discussed previously, in some embodiments, photonic crystal fibers are used in medical laser systems. For example, in some embodiments, a photonic crystal fiber can be used to deliver laser radiation to a patient undergoing a medical procedure. Referring to FIG. 13, a laser system 1300 for performing medical procedures includes a laser 1310, and a photonic crystal fiber 1320 to guide radiation 1312 from the laser to a target tissue 1399 of a patient. Laser radiation 1312 is focused by lens 1330 into photonic crystal fiber 1320, which delivers the radiation to handpiece 1340. During use, an operator (e.g., a medical practitioner, such as a surgeon, a dentist, an ophthalmologist, or a veterinarian) manipulates handpiece 1340 to provide target tissue 1399 with a desired dose of the laser radiation. Laser 1310 is controlled by an electronic controller 1350 including a display 1352 for setting and displaying operating parameters of the system. Handpiece 1340 includes electronic circuitry (not individually shown), which cooperates with an operating knob 1342. A connector 1346 communicates signals between handpiece 1340 and laser 1310 via controller 1350, controlling beam delivery to target tissue 1399 in response to the operator's adjustments of knob 1342. Handpiece 1340 also includes a stand off tip 1344, which maintains a desired distance between the end of fiber 1320 and target tissue 1399. In some embodiments, handpiece 1340 can include optical components (e.g., a lens or lenses), which focus the beam emitted from the fiber to a desired spot size. The waist of the focus beam can correspond to the distal end of the stand off tip.

In some embodiments, fiber 1320 can be easily installed and removed from a mount (not shown) which positions the proximal end of the fiber with respect to lens 1330, and from handpiece 1340. This can facilitate ease of use of the system in single-use applications, where the fiber is replaced after each procedure.

Laser system 1300 also includes a cooling apparatus 1370, which delivers a cooling fluid to fiber 1320 via a delivery tube 1372. In some embodiments, fiber 1320 can be positioned within a tube filled with the cooling fluid. In such instances, cooling system 1370 pumps cooling fluid through the tube, which absorbs heat emitted from the outer surface of the fiber. Alternatively, cooling system 1370 delivers the cooling fluid a hollow core of fiber 1320. The cooling fluid is pumped through the core and absorbs heat from the fiber surface adjacent the core. The cooling fluid can be liquid, gas, or superfluid. In some embodiments, the cooling fluid includes a noble gas and/or nitrogen. In certain embodiments, the cooling fluid is air. As another example, the cooling fluid can be water. The cooling fluid can be pumped in the in the same direction or counter to the direction of propagation of the laser radiation.

The length of photonic crystal fiber 1320 can vary as desired. In some embodiments, the fiber is about 1.2 m long or more (e.g., about 1.5 m or more, about 2 m or more, about 3 m or more, about 5 m or more, about 8 m or more, about 10 m or more). The length is typically dependent on the specific application for which the laser system is used. In applications where laser 1310 can be position close to the patient, and/or where the range of motion of the handpiece desired for the application is relatively small, the length of the fiber can be relatively short (e.g., about 1.5 m or less, about 1.2 m or less, about 1 m or less). However, in applications where it is inconvenient for the laser to be placed in close proximity to the patient and/or where a large range of motion of the handpiece is desired, the length of the fiber is longer (e.g., about 2 m or more, about 5 m or more, about 8 m or more). For example, in surgical applications, where a large team of medical practitioners is needed in close proximity to the patient, it may be desirable to place the laser away from the operating table (e.g., in the corner of the operating room, or in a different room entirely). In such situations, a longer fiber is desirable.

Light is coupled from laser 1310 into fiber 1320 by lens 1330 in system 1300. However, in certain embodiments, lens 1330 can be replaced by any coupler suitable for the wavelength and intensity at which the laser system operates. More generally, the coupler and/or the handpiece can include additional optical components, such as beam shaping optics, beam filters and the like.

Photonic crystal fiber 1320 can have a relatively large core diameter. For example, the photonic crystal fiber core diameter can be about 20$\lambda$ or more (e.g., about 30$\lambda$ or more, 40$\lambda$ or more, 50$\lambda$ or more, 75$\lambda$ or more, 100$\lambda$ or more, 150$\lambda$ or more, 200$\lambda$ or more), where $\lambda$ is the guided wavelength. Photonic crystal fiber 1320 core diameter can be about 100 µm or more (such as about 150 µm or more, 200 µm or more, 250 µm or more, 300 µm or more, 400 µm or more, 500 µm or more, 750 µm or more, 1,000 µm or more). Large core diameters can be advantageous, particularly in high power applications because the large core allows the fiber to guide higher power radiation by reducing power density in the core relative to a smaller core diameter fiber.

Alternatively, in other embodiments, photonic crystal fiber 1320 can have a relatively small core diameter. For example, photonic crystal fiber 1320 can have a core diameter of between about 0.2$\lambda$ and about 10$\lambda$ (e.g., about 8$\lambda$ or less, about 5λ or less, about 3λ or less, about 2λ or less, about 1λ or less). In some embodiments, the core is about 20 µm or less (e.g., about 15 µm or less, about 12 µm or less, about 10 µm or less, about 8 µm or less, about 5 µm or less, about 3 µm or less). Small core fibers may be advantageous where a small beam spot size at the target is desired. In some embodiments, a sufficiently small core can remove the need for focusing optics (e.g., a lens) that may otherwise be used to focus the beam to a small spot at the output end of the fiber.

Fiber 1320 can have a relatively thick outer diameter. Thick outer diameters can reduce the mechanical flexibility of the fiber, which can prevent the fiber from bending to small radii of curvature. Prevention of such bending may be advantageous where the bends can damage a fiber. For example, mechanical stress associated with a bend can damage the fiber. Alternatively, or additionally, a bend can increase attenuation of the guided radiation at the point of the bend in the fiber. The losses associated with the bend can result in local heating of the fiber, which can damage the fiber, especially in high power applications. Fiber 1320 can have an outer diameter of about 750 µm or more (e.g., about 1,000 µm or more, about 1,250 µm or more, about 1,500 µm or more, about 2,000 µm or more, about 3,000 µm or more, about 4,000 µm or more, about 5,000 µm or more).

Alternatively, in some embodiments, photonic crystal fiber 1320 has a narrow outer diameter. Narrow fibers are useful in applications where they are to be inserted into narrow spaces, such as into vascular tissue. In some embodiments, photonic crystal fiber 1320 has an outer diameter of about 500 µm or less (e.g., about 300 µm or less, about 200 µm or less, about 100 µm or less, about 75 µm or less, about 50 µm or less, about 30 µm or less, about 20 µm or less).

Jacket 230 can be formed from a polymer (e.g., an acrylate or silicone polymer) or other material. In applications where the jacket comes in contact with a patient, it can be formed from materials that conform to FDA standards for medical devices. In these instances, silicone polymers, for example, may be particularly suited for use as the jacket material. Typically, jacket 230 protects the fiber from external damage. As discussed previously, jacket 230 can also be designed to limit the flexibility of the fiber to prevent damage by small radius of curvature bends.

In addition to jacket 230, fiber 200 may include additional components to limit bend radii. For example, the fiber may include a spirally wound material around its outer diameter (e.g., a spirally wound wire). Alternatively, or additionally, the fiber may include additional jackets to provide additional mechanical support.

In some embodiments, the fiber may be constrained from bending to radii of curvature of less than about 50 cm (e.g., about 40 cm or less, 30 cm or less, 20 cm or less, 15 cm or less, 12 cm or less, 10 cm or less, 8 cm or less, 5 cm or less) during regular use in the application for which it is designed.

Alternatively, in applications that demand a high degree of flexibility of the fiber (e.g., endoscopic surgery or lithotripsy), the jacket can be designed to be relatively thin (e.g., about 500 µm or less) and/or flexible.

The jacket material may be selected so that the fiber is sterilizable. For example, the jacket material may be selected so that the fiber can withstand high temperatures (e.g., those experienced in autoclave).

While system 1300 includes handpiece 1340 at the distal end of the photonic crystal fiber, other beam deliver devices can also be used. For example, in some embodiments, system 1300 can include a footswitch that allows the operator to control delivery of laser radiation to the patient with his/her foot. In general, the delivery device is selected based on the end-use application of the system. For example, where radiation is delivered to a target area within a patient, the distal end of the fiber can be controlled using, e.g., an endoscope or other device.

Figure 14:
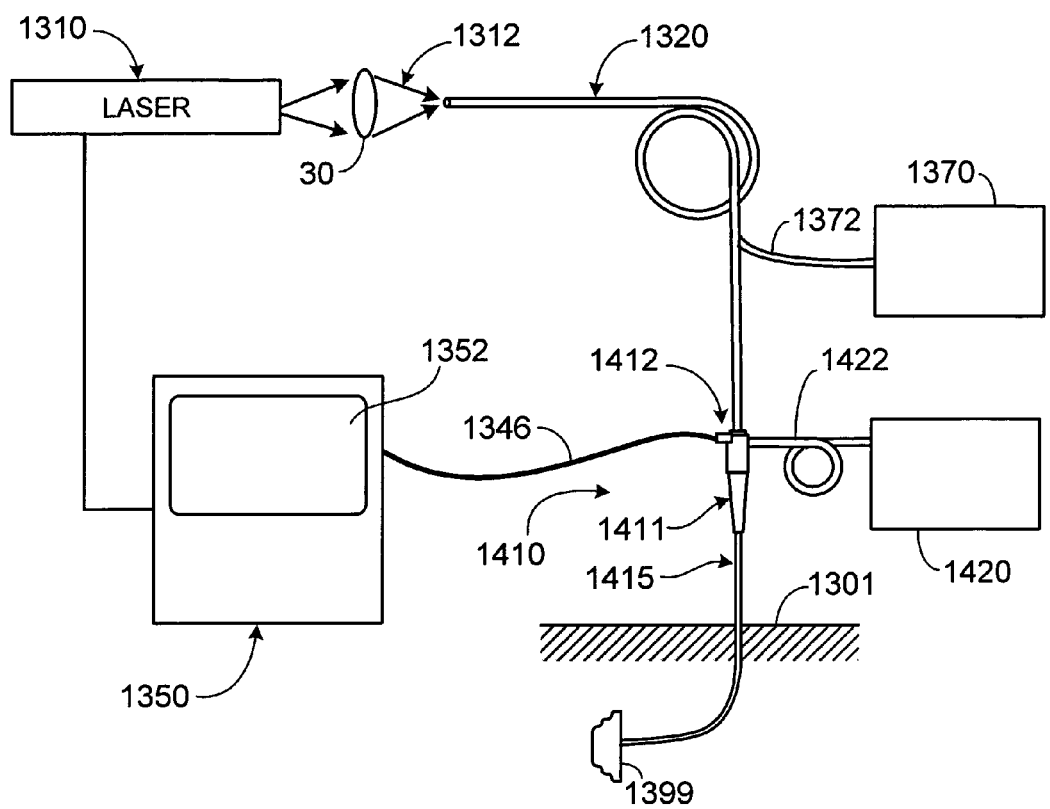
FIG. 14 is a schematic diagram of a medical laser system that includes a photonic crystal fiber and an endoscope.

An example of a system including an endoscope is shown in FIG. 14. Laser radiation 1412 is delivered to target tissue 1499 within a patient 1401 using an endoscope 1410. Endoscope 1410 includes a handpiece 1411 with laser control knob 1412, a delivery tube 1415, and an imaging cable 1422. Imaging cable 1422 houses fiber optics that provides illumination to the target tissue via delivery tube 1415. The imaging cable also guides light reflected from the target tissue to a controller 1420, where it is imaged and displayed providing visual information to the operator. Delivery tube 1415 houses both photonic crystal fiber 1420 and the imaging fiber optics (which can include conventional TIR fibers or photonic crystal fibers). Thus, once identified, the operator delivers radiation to the target tissue through photonic crystal fiber 1420. In some embodiments, endoscope 1410 can be used to deliver radiation from a $CO_2$ laser to target tissue 1499.

While delivery tube 1415 houses both photonic crystal fiber 1420 and imaging fiber optics, in general, photonic crystal fiber can be 1320 can be bundled with other fibers and/or tubes used in the procedure for which the system is designed. For example, in some embodiments, photonic crystal fiber can be bundled with another fiber that delivers radiation from another laser to perform a different function from the radiation delivered by the photonic crystal fiber. As an example, photonic crystal fiber 1320 can be bundled with another fiber waveguide for guiding an aiming beam to the tissue, where the aiming beam is a different wavelength and/or intensity from the radiation delivered from laser 1310. A light source of a distinctive color can be used to provide the aiming beam. For example, the aiming beam can be delivered from a visible laser, such as a HeNe laser, to provide a distinctive spot on the target tissue corresponding to the location to which photonic crystal fiber 1320 will deliver radiation.

As another example, photonic crystal fiber 1320 can guide 10.6 µm radiation from a $CO_2$ laser, and can be bundled with another fiber waveguide that guides 1.06 µm radiation from an Nd:YAG laser to the patient. $CO_2$ radiation can have a relatively shallow penetration depth in tissues (e.g., a few tens of µm), and may therefore be used as a precise incision beam. Nd:YAG radiation, on the other hand, can have a much larger penetration depth (e.g., about 1 cm), and may more effective than the $CO_2$ radiation for coagulation. Accordingly, photonic crystal fiber 1320 can be used to provide a cutting beam, while the Nd:YAG radiation is delivered for coagulation via a silica-based fiber (e.g., a TIR fiber), which can be better suited for guiding 1.06 mm radiation than the photonic crystal fiber.

In certain embodiments, the handpiece can be replaced by a robot, which can be operated remotely. For example, robot-performed surgery is under consideration in applications where a surgeon cannot easily or rapidly reach a patient (e.g., a wounded soldier on a battlefield).

In general, laser system 1300 can be used in a number of different medical applications. For example, laser system 1300 can be used in aesthetic medical procedures, surgical medical procedures, ophthalmic procedures, veterinary procedures, and/or dental procedures.

Aesthetic procedures include treatment for: hair removal; pulsed light skin treatments for reducing fine wrinkle lines, sun damage, age spots, freckles, some birthmarks, rosacea, irregular pigmentation, broken capillaries, benign brown pigment and pigmentation; skin resurfacing; leg veins; vascular lesions; pigmented lesions; acne; psoriasis & vitiligo; and/or cosmetic repigmentation.

Surgical procedures include procedures for gynecology, laparoscopy, condylomas and lesions of the external genitalia, and/or leukoplakia. Surgical applications can also include ear/nose/throat (ENT) procedures, such as laser assisted uvula palatoplasty (LAUP) (i.e., to stop snoring); procedures to remove nasal obstruction; stapedotomy; tracheobronchial endoscopy; tonsil ablation; and/or removal of benign laryngeal lesions. Surgical applications can also include breast biopsy, cytoreduction for metastatic disease, treatment of decubitus or statis ulcers, hemorrhoidectomy, laparoscopic surgery, mastectomy, and/or reduction mammoplasty. Surgical procedures can also include procedures in the field of podiatry, such as treatment of neuromas, periungual, subungual and plantar warts, porokeratoma ablation, and/or radical nail excision. Other fields of surgery in which lasers may be used include orthopedics, urology, gastroenterology, and thoracic & pulmonary surgery.

Ophthalmic uses include treatment of glaucoma, age-related macular degeneration (AMD), proliferative diabetic retinopathy, retinopathy of prematurity, retinal tear and detachment, retinal vein occlusion, and/or refractive surgery treatment to reduce or eliminate refractive errors.

Veterinary uses include both small animal and large animal procedures.

Examples of dental applications include hard tissue, soft tissue, and endodontic procedures. Hard tissue dental procedures include caries removal & cavity preparation and laser etching. Soft tissue dental procedures include incision, excision & vaporization, treatment of gummy smile, coagulation (hemostasis), exposure of unerupted teeth, aphthous ulcers, gingivoplasty, gingivectomy, gingival troughing for crown impressions, implant exposure, frenectomy, flap surgery, fibroma removal, operculectomy, incision & drainage of abscesses, oral papilectomy, reduction of gingival hypertrophy, pre-prosthetic surgery, pericoronitis, peri implantitis, oral lesions, and sulcular debridement. Endodontic procedures include pulpotomy, root canal debridement, and cleaning. Dental procedures also include tooth whitening.

Generally, the type of laser, wavelength, fiber length, fiber outer diameter, and fiber inner diameter, among other system parameters, are selected according to the application. For example, embodiments in which laser 1310 is a $CO_2$ laser, laser system 1300 can be used for surgical procedures requiring the ablation, vaporization, excision, incision, and coagulation of soft tissue. $CO_2$ laser systems can be used for surgical applications in a variety of medical specialties including aesthetic specialties (e.g., dermatology and/or plastic surgery), podiatry, otolaryngology (e.g., ENT), gynecology (including laparoscopy), neurosurgery, orthopedics (e.g., soft tissue orthopedics), arthroscopy (e.g., knee arthroscopy), general and thoracic surgery (including open surgery and endoscopic surgery), dental and oral surgery, ophthalmology, genitourinary surgery, and veterinary surgery.

In some embodiments, $CO_2$ laser systems can be used in the ablation, vaporization, excision, incision, and/or coagulation of tissue (e.g., soft tissue) in dermatology and/or plastic surgery in the performance of laser skin resurfacing, laser derm-abrasion, and/or laser burn debridement. Laser skin resurfacing (e.g. by ablation and/or vaporization) can be performed, for example, in the treatment of wrinkles, rhytids, and/or furrows (including fine lines and texture irregularities). Laser skin resurfacing can be performed for the reduction, removal, and/or treatment of: keratoses (including actinic keratosis), seborrhoecae vulgares, seborrheic wart, and/or verruca seborrheica; vermillionectomy of the lip; cutaneous horns; solar/actinic elastosis; cheilitis (including actinic cheilitis); lentigines (including lentigo maligna or Hutchinson's malignant freckle); uneven pigmentation/dyschromia; acne scars; surgical scars; keloids (including acne keloidalis nuchae); hemangiomas (including Buccal, port wine and/or pyogenic granulomas/granuloma pyogenicum/granuloma telagiectaticum); tattoos; telangiectasia; removal of skin tumors (including periungual and/or subungual fibromas); superficial pigmented lesions; adenosebaceous hypertrophy and/or sebaceous hyperplasia; rhinophyma reduction; cutaneous papilloma; milia; debridement of eczematous and/or infected skin; basal and squamous cel carcinoma (including keratoacanthomas, Bowen's disease, and/or Bowenoid Papulosis lesions); nevi (including spider, epidermal, and/or protruding); neurofibromas; laser de-epithelialization; tricoepitheliomas; xanthelasma palpebrarum; and/or syringoma. $CO_2$ laser systems can be used for laser ablation, vaporization and/or excision for complete and/or partial nail matrixectomy, for vaporization and/or coagulation of skin lesions (e.g., benign and/or malignant, vascular and/or avascular), and/or for Moh's surgery, for lipectomy. Further examples include using laser system 1300 for laser incision and/or excision of soft tissue for the performance of upper and/or lower eyelid blepharoplasty, and/or for the creation of recipient sites for hair transplantation.

In certain embodiments, $CO_2$ laser systems is used in the laser ablation, vaporization, and/or excision of soft tissue during podiatry procedures for the reduction, removal, and/or treatment of: verrucae vulgares/plantar warts (including paronychial, periungual, and subungual warts); porokeratoma ablation; ingrown nail treatment; neuromas/fibromas (including Morton's neuroma); debridement of ulcers; and/or other soft tissue lesions. $CO_2$ laser systems can also be used for the laser ablation, vaporization, and/or excision in podiatry for complete and/or partial matrixectomy.

$CO_2$ laser systems can be used for laser incision, excision, ablation, and/or vaporization of soft tissue in otolaryngology for treatment of: choanal atresia; leukoplakia (including oral, larynx, uvula, palatal, upper lateral pharyngeal tissue); nasal obstruction; adult and/or juvenile papillomatosis polyps; polypectomy of nose and/or nasal passages; lymphangioma removal; removal of vocal cord/fold nodules, polyps and cysts; removal of recurrent papillomas in the oral cavity, nasal cavity, larynx, pharynx and trachea (including the uvula, palatal, upper lateral pharyngeal tissue, tongue and vocal cords); laser/tumor surgery in the larynx, pharynx, nasal, ear and oral structures and tissue; Zenker' diverticulum/pharyngoesophageal diverticulum (e.g., endoscopic laser-assisted esophagodiverticulostomy); stenosis (including subglottic stenosis); tonsillectomy (including tonsillar cryptolysis, neoplasma) and tonsil ablation/tonsillotomy; pulmonary bronchial and tracheal lesion removal; benign and malignant nodules, tumors and fibromas (e.g., of the larynx, pharynx, trachea, tracheobronchial/endobronchial); benign and/or malignant lesions and/or fibromas (e.g., of the nose or nasal passages); benign and/or malignant tumors and/or fibromas (e.g., oral); stapedotomy/stapedectomy; acoustic neuroma in the ear; superficial lesions of the ear (including chondrodermatitis nondularis chronica helices/Winkler's disease); telangiectasia/hemangioma of larynx, pharynx, and/or trachea (including uvula, palatal, and/or upper lateral pharyngeal tissue); cordectomy, cordotomy (e.g., for the treatment of vocal cord paralysis/vocal fold motion impairment), and/or cordal lesions of larynx, pharynx, and/or trachea; myringotomy/tympanostomy (e.g., tympanic membrane fenestration); uvulopalatoplasty (e.g., LAUP); turbinectomy and/or turbinate reduction/ablation; septal spur ablation/reduction and/or septoplasty; partial glossectomy; tumor resection on oral, subfacial and/or neck tissues; rhinophyma; verrucae vulgares; and/or gingivoplasty/gingivectomy.

In some embodiments, $CO_2$ laser systems can be used for the laser incision, excision, ablation, and/or vaporization of soft tissue in gynecology for treatment of: conizaton of the cervix (including cervical intraepithelial neoplasia, vulvar and/or vaginal intraepithelial neoplasia); condyloma acuminata (including cervical, genital, vulvar, preineal, and/or Bowen's disease, and/or Bowenoid papulosa lesions); leukoplakia (e.g., vulvar dystrophies); incision and drainage of Bartholin's and/or nubuthian cysts; herpes vaporization; urethral caruncle vaporization; cervical dysplasia; benign and/or malignant tumors; and/or hemangiomas.

$CO_2$ laser systems can be used for the vaporization, incision, excision, ablation and/or coagulation of soft tissue in endoscopic and/or laparoscopic surgery, including gynecology laparoscopy, for treatment of: endometrial lesions (inclusing ablation of endometriosis); excision/lysis of adhesions; salpingostomy; oophorectomy/ovariectomy; fimbroplasty; metroplasty; tubal microsurgery; uterine myomas and/or fibroids; ovarian fibromas and/or follicle cysts; uterosacral ligament ablation; and/or hysterectomy.

In certain embodiments, CO2 laser systems are used for the laser incision, excision, ablation, and/or vaporization of soft tissue in neurosurgery for the treatment of cranial conditions, including: posterior fossa tumors; peripheral neurectomy; benign and/or malignant tumors and/or cysts (e.g., gliomos, menigiomas, acoustic neuromas, lipomas, and/or large tumors); arteriovenous malformation; and/or pituitary gland tumors. In some embodiments, $CO_2$ laser systems are used for the laser incision, excision, ablation, and/or vaporization of soft tissue in neurosurgery for the treatment of spinal cord conditions, including: incision/excision and/or vaporization of benign and/or malignant tumors and/or cysts; intra- and/or extradural lesions; and/or laminectomy/laminotomy/microdisectomy.

$CO_2$ laser systems can be used for the incision, excision, and/or vaporization of soft tissue in orthopedic surgery in applications that include arthroscopic and/or general surgery. Arthroscopic applications include: menisectomy; chondromalacia; chondroplasty; ligament release (e.g., lateral ligament release); excision of plica; and/or partial synovectomy. General surgery applications include: debridement of traumatic wounds; debridement of decubitis and/or diabetic ulcers; microsurgery; artificial joint revision; and/or polymer (e.g., polymethylmethacrylate) removal.

$CO_2$ laser systems can also be used for incision, excision, and/or vaporization of soft tissue in general and/or thoracic surgery, including endoscopic and/or open procedures. Such applications include: debridement of decubitus ulcers, stasis, diabetic and other ulcers; mastectomy; debridement of burns; rectal and/or anal hemorrhoidectomy; breast biopsy; reduction mammoplasty; cytoreduction for metastatic disease; laparotomy and/or laparoscopic applications; mediastinal and/or thoracic lesions and/or abnormalities; skin tag vaporization; atheroma; cysts (including sebaceous cysts, pilar cysts, and/or mucous cysts of the lips); pilonidal cyst removal and/or repair; abscesses; and/or other soft tissue applications.

In certain embodiments, $CO_2$ laser systems can be used for the incision, excision, and/or vaporization of soft tissue in dentistry and/or oral surgery, including for: gingivectomy; gingivoplasty; incisional and/or excisional biopsy; treatment of ulcerous lesions (including aphthous ulcers); incision of infection when used with antibiotic therapy; frenectomy; excision and/or ablation of benign and/or malignant lesions; homeostasis; operculectomy; crown lengthening; removal of soft tissue, cysts, and/or tumors; oral cavity tumors and/or hemangiomas; abscesses; extraction site hemostasis; salivary gland pathologies; preprosthetic gum preparation; leukoplakia; partial glossectomy; and/or periodontal gum resection.

In some embodiments, $CO_2$ laser systems can be used for incision, excision, and/or vaporization of soft tissue in genitourinary procedures, including for: benign and/or malignant lesions of external genitalia; condyloma; phimosis; and/or erythroplasia.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a photonic crystal fiber configured to guide a mode of electromagnetic radiation at a wavelength, λ, along a waveguide axis, the fiber comprising a core extending along the waveguide axis, and a confinement region extending along the waveguide axis and surrounding the core, the confinement region being configured to guide the mode of electromagnetic radiation at wavelength, λ, along the waveguide axis and being an all-dielectric confinement region comprising alternating layers of a first and a second dielectric material having thicknesses $d_1$ and $d_2$ and different refractive indices $n_1$ and $n_2$, respectively,
   wherein the thickness of at least one of the alternating layers of the first material differs from thickness $d_1^{QW}$ or at least one of the alternating layers of the second material differs from thickness $d_2^{QW}$, where $d_1^{QW}$ and $d_2^{QW}$ correspond to a quarter-wave condition for the two dielectric materials given by $d_1^{QW}=\lambda/(4\sqrt{n_1^2-1})$ and $d_2^{QW}=\lambda/(4\sqrt{n_2^2-1})$, respectively, and
   wherein the photonic crystal fiber has an attenuation for the guided mode at the wavelength λ that is reduced by a factor of about two or more relative to an attenuation for a reference fiber that is identical to the photonic crystal fiber except that the reference fiber has alternating layer thicknesses corresponding to the quarter-wave condition.

2. The apparatus of claim 1, wherein the confinement region includes an innermost layer that has a thickness different from $d_1^{QW}$ and $d_2^{QW}$.

3. The apparatus of claim 2, wherein the innermost layer has a thickness less than $d_1^{QW}$ and $d_2^{QW}$.

4. The apparatus of claim 2, wherein the innermost layer is one of the alternating layers of the first material.

5. The apparatus of claim 2, wherein the innermost layer comprises the first material and has a thickness different from $d_1$.

6. The apparatus of claim 2, wherein the confinement region includes a layer adjacent the innermost layer that has a thickness different from $d_1^{QW}$ and $d_2^{QW}$.

7. The apparatus of claim 6, wherein the layer adjacent the innermost layer comprises the second material and has a thickness different from $d_2$.

8. The apparatus of claim 1, wherein the confinement region further comprises one or more additional layers of the first material having a thickness different from $d_1$ and $d_1^{QW}$.

9. The apparatus of claim 8, wherein the confinement region further comprises one or more additional layers of the second material having thickness different from $d_2$ and $d_2^{QW}$.

10. The apparatus of claim 1, wherein the alternating layers are annular layers.

11. The apparatus of claim 1, wherein the alternating layers comprise a first spiral layer and a second spiral layer of a spiral portion.

12. The apparatus of claim 1, wherein the factor is about three or more.

13. The apparatus of claim 1, wherein the factor is about four or more.

14. The apparatus of claim 1, wherein the factor is about 10 or more.

15. The apparatus of claim 1, wherein the factor is about 50 or more.

16. The apparatus of claim 1, wherein the first and second materials have different absorptions at $\lambda$.

17. The apparatus of claim 1, wherein the first dielectric material has an absorption of about 1 dB/m or more at $\lambda$.

18. The apparatus of claim 1, wherein the first dielectric material has an absorption of about 10 dB/m or more at $\lambda$.

19. The apparatus of claim 1, wherein the first dielectric material has an absorption of about 100 dB/m or more at $\lambda$.

20. The apparatus of claim 17, wherein the second dielectric material has an absorption of about 1 dB/m or less at $\lambda$.

21. The apparatus of claim 17, wherein the second dielectric material has an absorption of 0.1 dB or less at $\lambda$.

22. The apparatus of claim 1, wherein the first and second dielectric materials have absorptions of $\alpha_1$ and $\alpha_2$ at $\lambda$, respectively, and a ratio $\alpha_1/\alpha_2$ is about 10 or more.

23. The apparatus of claim 1, wherein the first and second dielectric materials have absorptions of $\alpha_1$ and $\alpha_2$ at $\lambda$, respectively, and a ratio $\alpha_1/\alpha_2$ is about 100 or more.

24. The apparatus of claim 1, wherein the first and second dielectric materials have absorptions of $\alpha_1$ and $\alpha_2$ at $\lambda$, respectively, and a ratio $\alpha_1/\alpha_2$ is about 1,000 or more.

25. The apparatus of claim 1, wherein $|n_1-n_2|<0.1$.

26. The apparatus of claim 1, wherein $|n_1-n_2|<0.3$.

27. The apparatus of claim 1, wherein $|n_1-n_2|<0.5$.

28. The apparatus of claim 1, wherein $|n_1-n_2|<0.8$.

29. The apparatus of claim 1, wherein $\lambda$ is in a range from about 400 nm to about 900 nm.

30. The apparatus of claim 1, wherein $\lambda$ is in a range from about 900 nm to about 1,600 nm.

31. The apparatus of claim 1, wherein $\lambda$ is about 2,000 nm or more.

32. The apparatus of claim 1, wherein $\lambda$ is about 10.6 µm.

33. The apparatus of claim 1, wherein the first dielectric materials is a glass.

34. The apparatus of claim 33, wherein the glass is an inorganic glass.

35. The apparatus of claim 34, wherein the glass is a chalcogenide glass.

36. The apparatus of claim 35, wherein the chalcogenide glass comprises As and Se.

37. The apparatus of claim 34, wherein the second dielectric material is an inorganic glass.

38. The apparatus of claim 37, wherein the first dielectric material is a chalcogenide glass and the second dielectric material is a non-chalcogenide glass.

39. The apparatus of claim 38, wherein the non-chalcogenide glass is an oxide glass.

40. The apparatus of claim 1, wherein the first dielectric material is a polymer.

41. The apparatus of claim 40, wherein the polymer is a thermoplastic polymer.

42. The apparatus of claim 40, wherein the second dielectric material is an inorganic glass.

43. The apparatus of claim 40, wherein the second dielectric material is a polymer.

44. A system, comprising:
a laser;
the apparatus of claim 1; and
a delivery device,
wherein the apparatus is configured to accept radiation emitted from the laser and the delivery device allows an operator to direct radiation emitted from the apparatus to target tissue of a patient.

45. The system of claim 44, wherein the laser is a $CO_2$ laser.

46. The system of claim 44, wherein the delivery device comprises a handpiece.

47. The system of claim 44, wherein the delivery device comprises an endoscope.

48. An apparatus comprising:
a photonic crystal fiber configured to guide a mode of electromagnetic radiation at a wavelength, $\lambda$, along a waveguide axis, the fiber comprising a core extending along the waveguide axis, and a confinement region extending along the waveguide axis and surrounding the core, the confinement region comprising alternating layers of a first and a second dielectric material having thickness $d_1$ and $d_2$ and different refractive indices $n_1$ and $n_2$, respectively,
wherein the thickness of at least one of the alternating layers of the first material differs from thickness $d_1^{QW}$ and at least one of the alternating layers of the second material differs from thickness $d_2^{QW}$, the thickness of at least two of the alternating layers of the first material differs from thickness $d_1^{QW}$, or the thickness of at least two of the alternating layers of the second material differs from thickness $d_2^{QW}$, where $d_1^{QW}$, and $d_2^{QW}$ correspond to a quarter-wave condition for the two dielectric materials given by $d_1^{QW}=\lambda/(4\sqrt{n_1^2-1})$ and $d_2^{QW}=\lambda/(4\sqrt{n_2^2-1})$, respectively, and
wherein the photonic crystal fiber has an attenuation for the guided mode at the wavelength $\lambda$ that is reduced by a factor of about two or more relative to an attenuation for a reference fiber that is identical to the photonic crystal fiber except that the reference fiber has alternating layer thickness corresponding to the quarter-wave condition.

* * * * *